United States Patent
Alt et al.

(10) Patent No.: US 11,836,723 B2
(45) Date of Patent: *Dec. 5, 2023

(54) BLOCKCHAIN BASED ACCOUNT FUNDING AND DISTRIBUTION

(71) Applicant: STATE FARM MUTUAL AUTOMOBILE INSURANCE COMPANY, Bloomington, IL (US)

(72) Inventors: Jacob J. Alt, Downs, IL (US); Robert Alpine Jennings, Bloomington, IL (US); Amber Nelson-Wolfe, Bloomington, IL (US); Shyam Tummala, Bloomington, IL (US); Eric Bellas, Bloomington, IL (US); Jaime Skaggs, Chenoa, IL (US); Shawn M. Call, Bloomington, IL (US); Melinda Teresa Magerkurth, Utica, IL (US); Vicki King, Bloomington, IL (US); Charles H. Roscow, Bloomington, IL (US); Scott Shoop, Heyworth, IL (US); Greg Hayes, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,527

(22) Filed: Jul. 19, 2022

(65) Prior Publication Data

US 2022/0351205 A1 Nov. 3, 2022

Related U.S. Application Data

(63) Continuation of application No. 16/895,797, filed on Jun. 8, 2020, now Pat. No. 11,429,969, which is a
(Continued)

(51) Int. Cl.
*G06Q 20/40* (2012.01)
*G06F 21/64* (2013.01)
(Continued)

(52) U.S. Cl.
CPC ......... *G06Q 20/401* (2013.01); *G06F 21/105* (2013.01); *G06F 21/645* (2013.01);
(Continued)

(58) Field of Classification Search
CPC ............. G06Q 20/401; G06Q 20/3827; G06Q 20/3829; G06Q 20/4014; G06Q 40/08;
(Continued)

(56) References Cited

U.S. PATENT DOCUMENTS 5,241,466 A 8/1993 Perry et al.
7,127,457 B1 10/2006 Ghazal
(Continued)

FOREIGN PATENT DOCUMENTS

AU 2012200120 A1 7/2013
WO WO-2021/046494 A1 3/2021

OTHER PUBLICATIONS

"Blockchain in the Insurance Sector", PricewaterhouseCoopers LLP (2016).
(Continued)

*Primary Examiner* — Aravind K Moorthy
(74) *Attorney, Agent, or Firm* — MARSHALL, GERSTEIN & BORUN LLP

(57) ABSTRACT

The present methods and systems relate to using and accessing data stored in a blockchain, and in particular, interacting with the blockchain and users via smart contracts to handle account funding and distribution methods. The methods and systems include receiving a transaction from a participant, and verifying the transaction, such as by accessing a smart contract stored on the blockchain and checking a set of
(Continued)

parameters against a set of conditions stored in the smart contract. Depending on whether the set of parameters satisfy the conditions, the results may be communicated to participants about the success or failure of the transaction.

20 Claims, 17 Drawing Sheets

Related U.S. Application Data continuation of application No. 15/878,007, filed on Jan. 23, 2018, now Pat. No. 10,861,015.

(60) Provisional application No. 62/532,072, filed on Jul. 13, 2017, provisional application No. 62/532,102, filed on Jul. 13, 2017, provisional application No. 62/532,089, filed on Jul. 13, 2017, provisional application No. 62/528,806, filed on Jul. 5, 2017, provisional application No. 62/528,791, filed on Jul. 5, 2017, provisional application No. 62/523,523, filed on Jun. 22, 2017, provisional application No. 62/520,708, filed on Jun. 16, 2017, provisional application No. 62/520,648, filed on Jun. 16, 2017, provisional application No. 62/520,401, filed on Jun. 15, 2017, provisional application No. 62/520,376, filed on Jun. 15, 2017, provisional application No. 62/450,441, filed on Jan. 25, 2017.

(51) Int. Cl.
*H04L 9/32* (2006.01)
*G06Q 20/38* (2012.01)
*G06F 21/10* (2013.01)
*G06Q 40/08* (2012.01)
*H04L 9/00* (2022.01)
*G06F 21/62* (2013.01)

(52) U.S. Cl.
CPC ..... *G06Q 20/3827* (2013.01); *G06Q 20/3829* (2013.01); *G06Q 20/4014* (2013.01); *G06Q 40/08* (2013.01); *H04L 9/3236* (2013.01); *H04L 9/3239* (2013.01); *H04L 9/3247* (2013.01); *G06F 21/6245* (2013.01); *G06Q 2220/00* (2013.01); *G06Q 2220/18* (2013.01); *H04L 9/50* (2022.05); *H04L 2209/56* (2013.01)

(58) Field of Classification Search
CPC ............ G06Q 2220/00; G06Q 2220/18; G06F 21/105; G06F 21/645; G06F 21/6245; G06F 21/64; H04L 9/3236; H04L 9/3239; H04L 9/3247; H04L 9/50; H04L 2209/56
See application file for complete search history.

(56) References Cited

U.S. PATENT DOCUMENTS

| | | | |
|---|---|---|---|
| 8,166,003 B2 | 4/2012 | Friesenhahn et al. | |
| 8,359,221 B2 | 1/2013 | Gala | |
| 8,374,998 B2 | 2/2013 | Vautier | |
| 8,554,584 B2 | 10/2013 | Hargroder | |
| 8,930,253 B1 | 1/2015 | Ball | |
| 10,361,869 B2 | 7/2019 | Gorman | |
| 10,380,522 B1 | 8/2019 | Brahms et al. | |
| 10,454,878 B2 | 10/2019 | Khan et al. | |
| 10,482,538 B1 | 11/2019 | White et al. | |
| 10,521,780 B1 | 12/2019 | Hopkins, III et al. | |
| 10,529,042 B2 | 1/2020 | Brown et al. | |
| 10,586,062 B1 | 3/2020 | Rangan et al. | |
| 10,606,669 B2 | 3/2020 | Jacobs et al. | |
| 10,679,215 B2* | 6/2020 | Kurian | G06Q 20/3821 |
| 10,796,393 B2 | 10/2020 | Messerges et al. | |
| 10,805,085 B1 | 10/2020 | Liang | |
| 10,833,843 B1 | 11/2020 | Vijayvergia et al. | |
| 10,861,015 B1 | 12/2020 | Alt et al. | |
| 10,872,381 B1 | 12/2020 | Leise et al. | |
| 10,878,500 B2* | 12/2020 | Al-Masoud | G06F 16/951 |
| 10,878,512 B1 | 12/2020 | Al-Zoubi et al. | |
| 10,891,694 B1 | 1/2021 | Leise et al. | |
| 11,070,378 B1 | 7/2021 | Griffin et al. | |
| 11,195,177 B1 | 12/2021 | Vijayvergia | |
| 2002/0002476 A1 | 1/2002 | Mitsuoka et al. | |
| 2002/0019744 A1 | 2/2002 | Yamamoto | |
| 2003/0050829 A1 | 3/2003 | Dietz et al. | |
| 2004/0019557 A1 | 1/2004 | Yaruss et al. | |
| 2005/0033611 A1 | 2/2005 | Phelps | |
| 2005/0203815 A1 | 9/2005 | Abts et al. | |
| 2005/0262016 A1 | 11/2005 | Hill et al. | |
| 2006/0069717 A1 | 3/2006 | Mamou et al. | |
| 2006/0287949 A1 | 12/2006 | Silverman | |
| 2007/0094053 A1 | 4/2007 | Samuels | |
| 2007/0112772 A1 | 5/2007 | Morgan et al. | |
| 2008/0082370 A1 | 4/2008 | Collins et al. | |
| 2008/0281649 A1 | 11/2008 | Morris | |
| 2009/0100091 A1 | 4/2009 | Chandru et al. | |
| 2010/0153262 A1 | 6/2010 | Wirth et al. | |
| 2011/0113150 A1 | 5/2011 | Nunnery et al. | |
| 2012/0246085 A1 | 9/2012 | Depalma | |
| 2012/0253853 A1 | 10/2012 | Cameron et al. | |
| 2013/0091052 A1 | 4/2013 | Kaperdal et al. | |
| 2013/0159188 A1 | 6/2013 | Andon | |
| 2013/0173352 A1 | 7/2013 | Pande et al. | |
| 2013/0236598 A1 | 9/2013 | Budolfsen et al. | |
| 2013/0290198 A1 | 10/2013 | Vassil | |
| 2014/0101060 A1 | 4/2014 | Calman et al. | |
| 2015/0052045 A1 | 2/2015 | De Luca et al. | |
| 2015/0193638 A1 | 7/2015 | Cook | |
| 2015/0379510 A1 | 12/2015 | Smith | |
| 2016/0078551 A1 | 3/2016 | Samuels | |
| 2016/0261411 A1 | 9/2016 | Yau et al. | |
| 2016/0299918 A1 | 10/2016 | Ford | |
| 2016/0300043 A1 | 10/2016 | Bi et al. | |
| 2016/0335533 A1 | 11/2016 | Davis et al. | |
| 2016/0342985 A1 | 11/2016 | Thomas et al. | |
| 2016/0342987 A1* | 11/2016 | Thomas | G06Q 40/00 |
| 2016/0357550 A1* | 12/2016 | Thomas | G06F 11/182 |
| 2017/0005804 A1 | 1/2017 | Zinder | |
| 2017/0011460 A1 | 1/2017 | Molinari et al. | |
| 2017/0039330 A1 | 2/2017 | Tanner, Jr. et al. | |
| 2017/0046651 A1 | 2/2017 | Lin et al. | |
| 2017/0046664 A1 | 2/2017 | Haldenby et al. | |
| 2017/0046698 A1 | 2/2017 | Haldenby et al. | |
| 2017/0046806 A1 | 2/2017 | Haldenby et al. | |
| 2017/0048235 A1 | 2/2017 | Lohe et al. | |
| 2017/0083907 A1 | 3/2017 | McDonough et al. | |
| 2017/0085545 A1 | 3/2017 | Lohe et al. | |
| 2017/0103468 A1 | 4/2017 | Orsini et al. | |
| 2017/0132621 A1 | 5/2017 | Miller et al. | |
| 2017/0132630 A1 | 5/2017 | Castinado et al. | |
| 2017/0149796 A1* | 5/2017 | Gvili | H04L 63/0428 |
| 2017/0155515 A1 | 6/2017 | Androulaki | |
| 2017/0177855 A1 | 6/2017 | Costa Faidella et al. | |
| 2017/0178127 A1 | 6/2017 | Kravitz | |
| 2017/0186085 A1 | 6/2017 | Nagla | |
| 2017/0206604 A1 | 7/2017 | Al-Masoud | |
| 2017/0214522 A1 | 7/2017 | Code et al. | |
| 2017/0214699 A1 | 7/2017 | Johnsrud | |
| 2017/0243208 A1 | 8/2017 | Kurian et al. | |
| 2017/0244707 A1 | 8/2017 | Johnsrud et al. | |
| 2017/0244757 A1 | 8/2017 | Castinado et al. | |
| 2017/0277909 A1 | 9/2017 | Kraemer et al. | |
| 2017/0279774 A1 | 9/2017 | Booz et al. | |
| 2017/0279783 A1 | 9/2017 | Milazzo et al. | |
| 2017/0300627 A1 | 10/2017 | Giordano et al. | |
| 2017/0344988 A1 | 11/2017 | Cusden et al. | |
| 2017/0345011 A1* | 11/2017 | Salami | G06Q 20/42 |
| 2017/0372300 A1 | 12/2017 | Dunlevy et al. | |
| 2017/0372308 A1* | 12/2017 | Metnick | G06Q 20/12 |
| 2018/0019873 A1 | 1/2018 | Kraemer et al. | |

(56) References Cited

U.S. PATENT DOCUMENTS

| | | | |
|---|---|---|---|
| 2018/0040040 A1* | 2/2018 | Barski | G06Q 20/3678 |
| 2018/0046992 A1 | 2/2018 | Hanrahan et al. | |
| 2018/0075028 A1 | 3/2018 | Ruschin et al. | |
| 2018/0089436 A1 | 3/2018 | Smith et al. | |
| 2018/0089655 A1 | 3/2018 | Mcdonald et al. | |
| 2018/0096360 A1 | 4/2018 | Christidis et al. | |
| 2018/0097779 A1 | 4/2018 | Karame et al. | |
| 2018/0101906 A1 | 4/2018 | Mcdonald et al. | |
| 2018/0109516 A1 | 4/2018 | Song et al. | |
| 2018/0109541 A1 | 4/2018 | Gleichauf | |
| 2018/0113752 A1 | 4/2018 | Derbakova et al. | |
| 2018/0129955 A1 | 5/2018 | Saxena et al. | |
| 2018/0130034 A1 | 5/2018 | Taylor et al. | |
| 2018/0137465 A1 | 5/2018 | Batra et al. | |
| 2018/0165758 A1 | 6/2018 | Saxena et al. | |
| 2018/0181751 A1 | 6/2018 | Jagadeesan et al. | |
| 2018/0181768 A1 | 6/2018 | Leporini et al. | |
| 2018/0197173 A1* | 7/2018 | Durvasula | G06Q 20/3823 |
| 2018/0218455 A1 | 8/2018 | Kolb et al. | |
| 2018/0225611 A1 | 8/2018 | Daniel et al. | |
| 2018/0247302 A1 | 8/2018 | Armstrong et al. | |
| 2018/0315025 A1 | 11/2018 | McKay | |
| 2018/0322587 A1 | 11/2018 | Linne | |
| 2019/0013931 A1 | 1/2019 | Benini | |
| 2019/0019183 A1 | 1/2019 | Karame et al. | |
| 2019/0019186 A1 | 1/2019 | Falah et al. | |
| 2019/0197620 A1 | 6/2019 | Jayaram et al. | |
| 2019/0266178 A1 | 8/2019 | Madhavan et al. | |
| 2019/0268284 A1 | 8/2019 | Karame et al. | |
| 2019/0354966 A1 | 11/2019 | Himura et al. | |
| 2019/0392437 A1 | 12/2019 | Castagna et al. | |
| 2019/0392438 A1 | 12/2019 | Rice | |
| 2020/0036519 A1 | 1/2020 | Bitauld et al. | |
| 2020/0058071 A1 | 2/2020 | Yang | |
| 2020/0065763 A1 | 2/2020 | Rosinzonsky et al. | |
| 2020/0177373 A1 | 6/2020 | Komandur et al. | |
| 2020/0226677 A1 | 7/2020 | Dhawan et al. | |
| 2020/0250753 A1 | 8/2020 | Blount | |
| 2020/0272966 A1 | 8/2020 | Kirkegaard | |
| 2020/0279328 A1 | 9/2020 | Zhiri et al. | |
| 2020/0341971 A1 | 10/2020 | Krishnaswamy et al. | |
| 2020/0394321 A1 | 12/2020 | Ramos et al. | |
| 2020/0394322 A1 | 12/2020 | Ramos et al. | |
| 2020/0409937 A1 | 12/2020 | Wang et al. | |
| 2021/0065293 A1 | 3/2021 | Sigler et al. | |
| 2021/0090037 A1 | 3/2021 | Dowding | |
| 2021/0174442 A1 | 6/2021 | Trudeau et al. | |

OTHER PUBLICATIONS

"Life Insurance Contestability: 7 Things to Know", Nasdaq, published Sep. 6, 2013.

"The Great Chain of Being Sure About Things", The Economist, posted online: <https://www.economist.com/briefing/2015/10/31/the-great-chain-of-being-sure-about-things> Oct. 31, 2015.

"U.S. Standard Certficate of Death", U.S. Center for Disease Control, downloaded from the Internet at: <https://www.cdc.gov/nchs/data/dvs/DEATH11-03final-acc.pdf> Nov. 2003.

"Understanding the Fine Print: What to Keep an Eye Out for in Your Life Insurance", Gerber Life Insurance, published Mar. 15, 2015.

Cohen, "When Life Insurance Companies May Reject a Claim", Nerdwallet, downloaded from the Internet at: <https://www.nerdwallet.com/blog/insurance/life-insurance-policy-reject-claim/> published Aug. 21, 2015.

Cointelegraph, "HashCoin Uses Emercoin Blockchain For Vehicle Registration And Tracking". Retrieved from the Internet at: <https://cointelegraph.com/news/hashcoin-uses-emercoin-blockchain-for-vehicle-registration-and-tracking> (2018).

Gambhir et al., Can creditors take my life insurance, PolicyGenius (Jun. 11, 2021).

U.S. Appl. No. 15/877,982, Final Office Action, dated Feb. 23, 2021.

U.S. Appl. No. 15/877,982, Final Office Action, dated Jun. 4, 2020.

U.S. Appl. No. 15/877,982, Nonfinal Office Action, dated Jan. 31, 2020.

U.S. Appl. No. 15/877,982, Nonfinal Office Action, dated Nov. 4, 2021.

U.S. Appl. No. 15/877,982, Nonfinal Office Action, dated Sep. 22, 2020.

U.S. Appl. No. 15/878,007, Nonfinal Office Action, dated Oct. 22, 2019.

U.S. Appl. No. 15/878,028, Final Office Action, dated Sep. 21, 2020.

U.S. Appl. No. 15/878,028, Nonfinal Office Action, dated Feb. 14, 2020.

U.S. Appl. No. 15/878,028, Nonfinal Office Action, dated May 21, 2020.

U.S. Appl. No. 15/878,046, Final Office Action, dated Mar. 29, 2021.

U.S. Appl. No. 15/878,046, Final Office Action, dated May 27, 2020.

U.S. Appl. No. 15/878,046, Final Office Action, dated Oct. 9, 2020.

U.S. Appl. No. 15/878,046, Nonfinal Office Action, dated Aug. 18, 2020.

U.S. Appl. No. 15/878,046, Nonfinal Office Action, dated Aug. 30, 2021.

U.S. Appl. No. 15/878,046, Nonfinal Office Action, dated Mar. 17, 2020.

U.S. Appl. No. 15/878,046, Nonfinal Office Action, dated Nov. 20, 2020.

U.S. Appl. No. 15/878,067, Final Office Action, dated Apr. 7, 2021.

U.S. Appl. No. 15/878,067, Final Office Action, dated May 1, 2020.

U.S. Appl. No. 15/878,067, Nonfinal Office Action, dated Nov. 12, 2019.

U.S. Appl. No. 15/878,067, Nonfinal Office Action, dated Nov. 24, 2020.

U.S. Appl. No. 15/878,082, Final Office Action, dated Nov. 17, 2020.

U.S. Appl. No. 15/878,082, Nonfinal Office Action, dated Oct. 8, 2020.

U.S. Appl. No. 15/878,106, Final Office Action, dated Nov. 16, 2020.

U.S. Appl. No. 15/878,106, Nonfinal Office Action, dated Jun. 25, 2020.

U.S. Appl. No. 15/878,125, Final Office Action, dated Apr. 17, 2020.

U.S. Appl. No. 15/878,125, Final Office Action, dated Dec. 1, 2020.

U.S. Appl. No. 15/878,125, Nonfinal Office Action, dated Aug. 31, 2020.

U.S. Appl. No. 15/878,125, Nonfinal Office Action, dated Dec. 6, 2019.

U.S. Appl. No. 15/878,140, Final Office Action, dated Apr. 9, 2020.

U.S. Appl. No. 15/878,140, Nonfinal Office Action, dated Jul. 20, 2020.

U.S. Appl. No. 15/878,140, Nonfinal Office Action, dated Nov. 13, 2019.

U.S. Appl. No. 15/878,154, Final Office Action, dated Apr. 6, 2021.

U.S. Appl. No. 15/878,154, Final Office Action, dated Sep. 29, 2020.

U.S. Appl. No. 15/878,154, Nonfinal Office Action, dated Jun. 10, 2020.

U.S. Appl. No. 15/878,154, Nonfinal Office Action, dated Nov. 25, 2020.

U.S. Appl. No. 16/895,797, Nonfinal Office Action, dated Jan. 25, 2022.

U.S. Appl. No. 15/878,140, Appeal No. 2021-004101, Patent Trial and Appeal Board Decision, dated Jul. 26, 2022.

* cited by examiner

BLOCKCHAIN BASED ACCOUNT FUNDING AND DISTRIBUTION

CROSS REFERENCE TO RELATED APPLICATIONS

This application claims priority to Non-Provisional application Ser. No. 16/895,797, entitled "Blockchain Based Account Funding and Distribution," filed Jun. 8, 2020, which claims priority to Non-Provisional application Ser. No. 15/878,007, entitled "Blockchain Based Account Funding and Distribution," filed Jan. 23, 2018, which claims priority to: (1) Provisional Application No. 62/450,441, entitled "Using Blockchain for Banking, Asset, and Identity Services," filed Jan. 25, 2017, (2) Provisional Application No. 62/520,401, entitled "Blockchain Based Account Funding and Distribution," filed Jun. 15, 2017, (3) Provisional Application No. 62/520,376, entitled "Blockchain Based Banking Identity Authentication," filed Jun. 15, 2017, (4) Provisional Application No. 62/520,648, entitled "Blockchain Based Card Activation," filed Jun. 16, 2017, (5) Provisional Application No. 62/520,708, entitled "Blockchain Based Passing Registry Actions," filed Jun. 16, 2017, (6) Provisional Application No. 62/523,523, entitled "Blockchain Based Asset Access," filed Jun. 22, 2017, (7) Provisional Application No. 62/528,791, entitled "Blockchain Based Lien Perfection," filed Jul. 5, 2017, (8) Provisional Application No. 62/528,806, entitled "Blockchain Based Settlement Processes," filed Jul. 5, 2017, (9) Provisional Application No. 62/532,072, entitled "Blockchain Based Contractor Ratings," filed Jul. 13, 2017, (10) Provisional Application No. 62/532,089, entitled "Blockchain Based Customer Records," filed Jul. 13, 2017, and (11) Provisional Application No. 62/532,102, entitled "Blockchain Based Associate Information and Licensing," filed Jul. 13, 2017, each of which is incorporated herein by reference in its entirety.

TECHNICAL FIELD

The present disclosure relates to using and accessing data stored in a blockchain. In particular, interacting with the blockchain and users of the blockchain via smart contracts, and protocols to perform account funding and distribution related activities.

BACKGROUND

In the business world, an interaction between a business and a customer, or the business and another business, typically requires validation of one or more pieces of information before a transaction can take place. This validation is often achieved by the participants involved in the interaction contacting a central authority that is a trusted source of truth for the particular piece of information. The central authority may then validate, or not validate the particular piece of information and communicate its findings to the participants. Based upon the validation, or lack of validation, a consensus among the participants is formed and assuming the information is valid the transaction between the participants may take place, and subsequently be recorded. Similar issues arise between citizens and their governments, and businesses and governments.

Traditionally, businesses, customers, and central authorities have stored information related to transactions, and records of transactions, in databases, or ledgers which have been used in accounting to track transactions and information related to those transactions. Often these databases or ledgers held by the participants must be reconciled to achieve consensus as to the validity of the information stored in the databases and ledgers. Alternatively, as described above the central authority may be responsible for determining the validity of information stored in a database or a ledger and functioning as an arbiter of consensus for interested parties.

A blockchain is a new way of achieving a distributed consensus on the validity or invalidity of information. As opposed to using a central authority, a blockchain is a distributed database or ledger, in which a transactional record is maintained at each node of a peer to peer network. Commonly, the distributed ledger is comprised of groupings of transactions bundled together into a "block." When a change to the distributed ledger is made (e.g., when a new transaction and/or block is created), each node must form a consensus as to how the change is integrated into the distributed ledger. Upon consensus, the agreed upon change is pushed out to each node so that each node maintains an identical copy of the updated distributed ledger. Any change that does not achieve a consensus is ignored. Accordingly, unlike a traditional system which uses a central authority, a single party cannot unilaterally alter the distributed ledger. This inability to modify past transactions lead to blockchains being generally described as trusted, secure, and/or immutable.

Blockchains are typically deployed in an open, decentralized, and permissionless manner meaning that any party may view information, submit new information, or join the blockchain as a node responsible for confirming information. This open, decentralized, and permissionless approach to a blockchain has limitations. As an example, these blockchains may not be good candidates for interactions that require information to be kept private, or for interactions that require all participants to be vetted prior to their participation.

BRIEF SUMMARY

In one aspect, a computer-implemented method for account management using smart contracts stored on a blockchain maintained by a plurality of participants may be provided. The method may include, via one or more processors, servers, and/or transceivers, (1) receiving (such as via wireless communication or data transmission over one or more radio frequency links or communication channels) at least one transaction from at least one participant, wherein the at least one transaction has a set of parameters; (2) verifying the at least one transaction, wherein verifying includes accessing a smart contract stored on the blockchain and checking the set of parameters against a set of conditions stored in the smart contract; and (3) when the set of parameters satisfy the set of conditions, (i) indicating a change in a balance for the at least one participant; and (ii) generating and transmitting (such as via wireless communication or data transmission over one or more radio frequency links or communication channels) a confirmation to the at least one participant that the transaction has been approved; and/or (4) when the set of parameters do not satisfy the set of conditions, generating and transmitting (such as via wireless communication or data transmission over one or more radio frequency links or communication channels) a rejection to the at least one participant that the transaction has been rejected. The method may include additional, less, or alternate actions, including those discussed elsewhere herein.

In another aspect, a computer-implemented method for account funding and distribution using smart contracts stored on a blockchain maintained by a plurality of participants may be provided. The method may include, via one or more processors, servers, and/or transceivers, (1) receiving (such as via wireless communication or data transmission over one or more radio frequency links or communication channels) a request for funds from at least one participant, wherein the request for funds has a set of parameters; (2) verifying the request for funds, wherein verifying includes accessing a smart contract stored on the blockchain and checking the set of parameters against a set of conditions stored in the smart contract; and (3) when the set of parameters satisfy the set of conditions, (i) satisfying the request for funds by transmitting the corresponding amount of funds to the at least one participant; (ii) generating and transmitting (such as via wireless communication or data transmission over one or more radio frequency links or communication channels) a confirmation to the at least one participant that the request for funds has been approved; (iii) generating a block of transactions representative of requests for funds containing the at least one request for funds, and/or (iv) transmitting (such as via wireless communication or data transmission over one or more radio frequency links or communication channels) the block of transactions to at least one participant; and/or (4) when the set of parameters do not satisfy the set of conditions, generating and transmitting (such as via wireless communication or data transmission over one or more radio frequency links or communication channels) a rejection to the at least one participant that the request for funds has been rejected. The method may include additional, less, or alternate actions, including those discussed elsewhere herein.

In yet another aspect, a computer system for account funding and distribution using smart contracts stored on a blockchain maintained by a plurality of participants may be provided. The computer system may include a memory configured to store non-transitory computer executable instructions; and a processor (and an associated transceiver) configured to interface with the memory, wherein the processor is configured to execute non-transitory computer executable instructions. The non-transitory computer executable instructions to cause the processor and/or associated transceiver to: (1) receive (such as via wireless communication or data transmission over one or more radio frequency links or communication channels) at least one request for funds from at least one participant, wherein the at least one transaction has a set of parameters; (2) validate the request for funds, wherein validate includes accessing a smart contract stored on the blockchain and checking the set of parameters against a set of conditions stored in the smart contract; and (3) when the set of parameters satisfy the set of conditions, (i) indicate a change in a fund balance for the at least one participant; and (ii) generate and transmit (such as via wireless communication or data transmission over one or more radio frequency links or communication channels) a confirmation to the at least one participant that the transaction has been approved; and/or (4) when the set of parameters do not satisfy the set of conditions, generate and transmit (such as via wireless communication or data transmission over one or more radio frequency links or communication channels) a rejection to the at least one participant that the transaction has been rejected. The system may include additional, less, or alternate functionality, including that discussed elsewhere herein.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive

BRIEF DESCRIPTION OF DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1A:
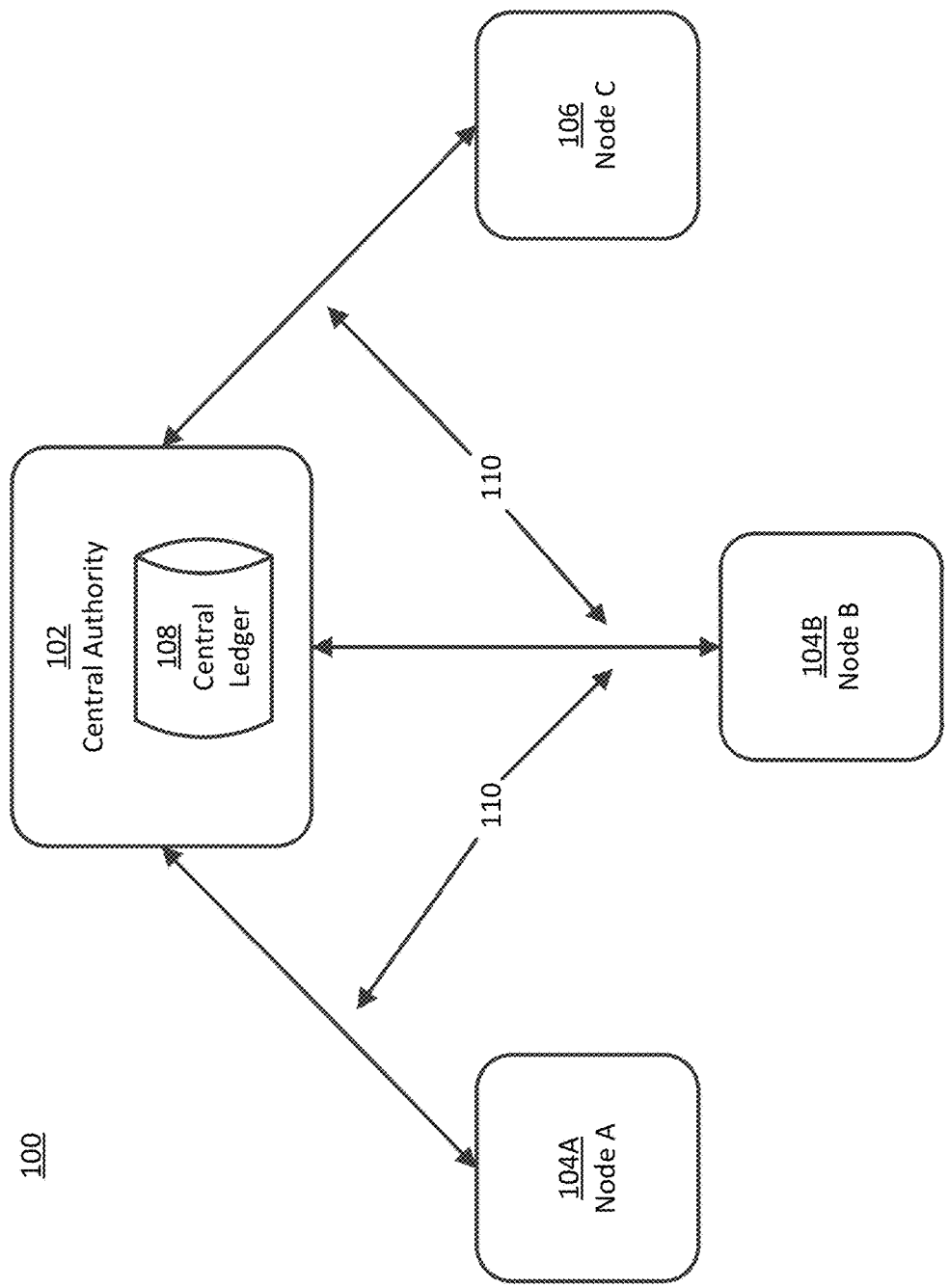
FIG. 1A depicts an exemplary database system 100 in accordance with one aspect of the present disclosure.

As stated, the Figures depict aspects of the present embodiments for purposes of illustration only. One skilled in the art will readily recognize from the following discussion that alternate aspects of the structures and methods illustrated herein may be employed without departing from the principles of the invention described herein.

DETAILED DESCRIPTION

The present embodiments relate to, inter alia, systems and methods for using a blockchain to perform services related to banking, identity management, and insurance applications. The systems and methods described herein allow for using a blockchain which gives the option for private information, and permissioned participants in the blockchain. In particular, the systems and methods allow for a distributed consensus amongst businesses, consumers, and authorities, as to the validity of information and transactions stored on the blockchain. The businesses, authorities, and consumers may all be considered participants in the blockchain network. For example, businesses (e.g., banks, financial institutions, insurers), and their customers, as well as regulators, may all be participants in the blockchain network, which may be open and permissionless, or closed and permissioned. Each of these participants may maintain nodes that are part of the blockchain network, but may also maintain their own systems and networks that may interface with the blockchain network.

Some exemplary, but not limiting, applications that may take advantage of the disclosed systems and methods include specific applications directed to banking, mutual funds, and insurance. These examples relate to problems surrounding money transfers, digital identities, and collective reporting. Specifically, such applications may be: identity authentication, account funding and distribution, card activation, actions trigged by death registry, using and accessing asset data lien perfection obtaining settlement values contractor ratings/evaluations single view of customer's products, associate licensing, using and accessing user data, blockchain based payments, interest validation, industry reporting, agent sales data fund transfers, unclaimed property, auditing and compliance, policy delivery and interaction, and exercising riders and form/rate filing.

The above listed examples, and disclosed systems and methods, may use an application of distributed ledgers, where each new block may be cryptographically linked to the previous block in order to form a "blockchain." More particularly, to create a new block, each transaction within a block may be assigned a hash value (i.e., an output of a cryptographic hash function, such as SHA-256 or MD5). These hash values may then be combined together utilizing cryptographic techniques (e.g., a Merkle Tree) to generate a hash value representative of the entire new block, and consequently the transactions stored in the block. This hash value may then be combined with the hash value of the previous block to form a hash value included in the header of the new block, thereby cryptographically linking the new block to the blockchain. To this end, the precise value utilized in the header of the new block is dependent on the hash value for each transaction in the new block, as well as the hash value for each transaction in every prior block.

According to certain aspects disclosed herein, information stored in blockchains can be trusted, because the hash value generated for the new block and a nonce value (an arbitrary number used once) are used as inputs into a cryptographic puzzle. The cryptographic puzzle may have a difficulty set by the nodes connected to the blockchain network, or the difficulty may be set by administrators of the blockchain network. In one example of the cryptographic puzzle, a solving node uses the hash value generated for the new block and repeatedly changes the value of the nonce until a solution for the puzzle is found. For example, finding the solution to the cryptographic puzzle may involve finding the nonce value that meets certain criteria (e.g., the nonce value begins with five zeros).

When a solution to the cryptographic puzzle is found, the solving node publishes the solution and the other nodes then verify that the solution is the correct solution. Because the solution also depends on the particular hash values for each transaction within the blockchain, if the solving node attempted to modify any transaction, the solution would not be verified by the other nodes. More particularly, if a single node attempts to modify a prior transaction within the blockchain, a cascade of different hash values are generated for each tier of the cryptographic combination technique. This results in the header for one or more blocks being different than the corresponding header(s) in every other node that did not make the exact same modification.

As a result, the solution generated by the modifying node would not solve the cryptographic puzzle presented to any node without the identical modification. Thus, the version of the new block generated by the modifying node is readily recognized as including an improper modification and is rejected by the consensus. This inability to modify past transactions lead to blockchains being generally described as trusted, secure, and/or immutable.

The systems and methods disclosed herein also include performing actions utilizing the distributed consensus achieved through the blockchain. In particular, these actions may be executed by smart contracts. A smart contract is a computer protocol that enables the automatic execution and/or enforcement of an agreement between different parties. The smart contract may include one or more trigger conditions, that, when satisfied, correspond to one or more actions. For some smart contracts, which action(s) from the one or more actions are performed is determined based upon one or more decision conditions. Nodes on the network may subscribe to one or more data streams including data related to a trigger condition and/or a decision condition. Accordingly, the nodes may route the data streams to the smart contract so that the smart contract may detect that a trigger condition has occurred and/or analyze a decision condition to direct the node to perform one or more actions.

Exemplary Database & Distributed Ledger

FIG. 1A depicts an exemplary database system 100 in accordance with one aspect of the present disclosure. FIG. 1A includes a central authority 102, a plurality of nodes 104A, 104B, and 106, a central ledger 108, and a plurality of network connections 110. In one example operation of the database system 100, one of the nodes, for example Node A 104A, would issue a request to the central authority 102 to perform an action on data stored in the central ledger 108. This request may be a request to create, read, update, or delete data that is stored in the central ledger 108.

The central authority 102 would receive the request, processes the request, make any necessary changes to the data stored in the central ledger 108, and inform the requesting node, Node A 104A, of the status of the request. The central authority 102 may also send out status updates to the other nodes on the network about the change made, if any, to the data as requested by Node A 104A. In the database system 100, all interaction with the data stored in the central ledger 108 occurs through the central authority 102. In this way, the central authority functions as a gatekeeper of the data.

Accordingly, the central authority 102 operates a single point of entry for interacting with the data, and consequently the central authority 102 is a single point of failure for the entire database system 100. As such, if the central authority 102 is not accessible to the nodes in the database system 100, then the data stored in the central ledger 108 is not accessible. In another example, each individual node may keep their own databases and then at the end of the day each node sends a copy of their database to the central authority 102 where the databases received are reconciled to form a single cohesive record of the data stored in the central ledger 108.

Figure 1B:
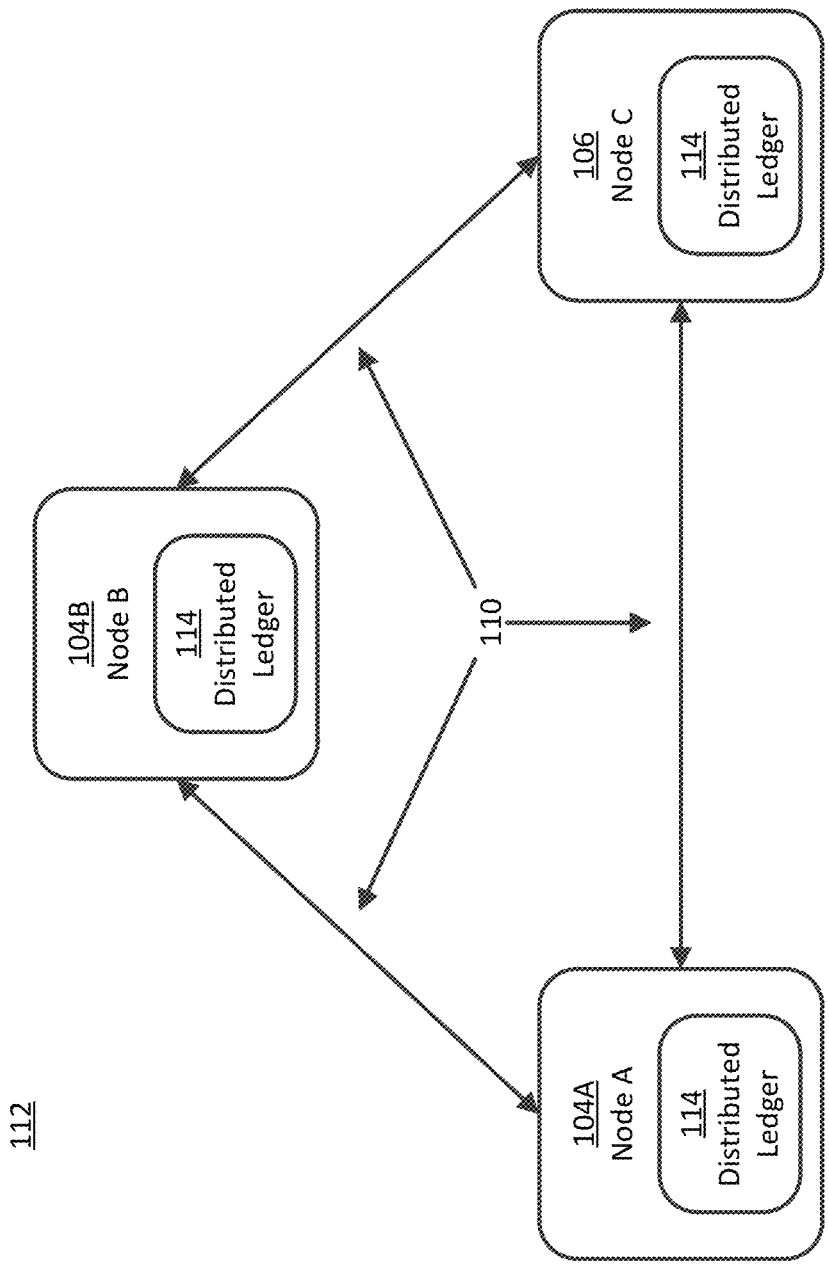
FIG. 1B depicts an exemplary distributed ledger system 112 in accordance with one aspect of the present disclosure.

Conversely, FIG. 1B depicts an exemplary distributed ledger system 112 in accordance with one aspect of the present disclosure. An example of a distributed ledger system 112 is the blockchain system described above. FIG. 1B includes a plurality of nodes 104A, 104B, and 106, a distributed ledger 114, and network connections 110. In a distributed ledger system 112, each node keeps a copy of the distributed ledger 114. As changes are made to the distributed ledger 114 each node updates their copy of the distributed ledger 114. A consensus mechanism may be used by the nodes in the distributed ledger system 112 to decide when it is appropriate to make changes to the distributed ledger 114.

Therefore, each node has their own copy of the distributed ledger 114, which is identical to every other copy of the distributed ledger 114 stored by each other node. The distributed ledger system 112 is more robust than a central authority database system, which is depicted in FIG. 1A, because the distributed ledger system 112 is decentralized and there is no single point of failure.

Exemplary Transaction Flow & Block Propagation

Figure 2A:
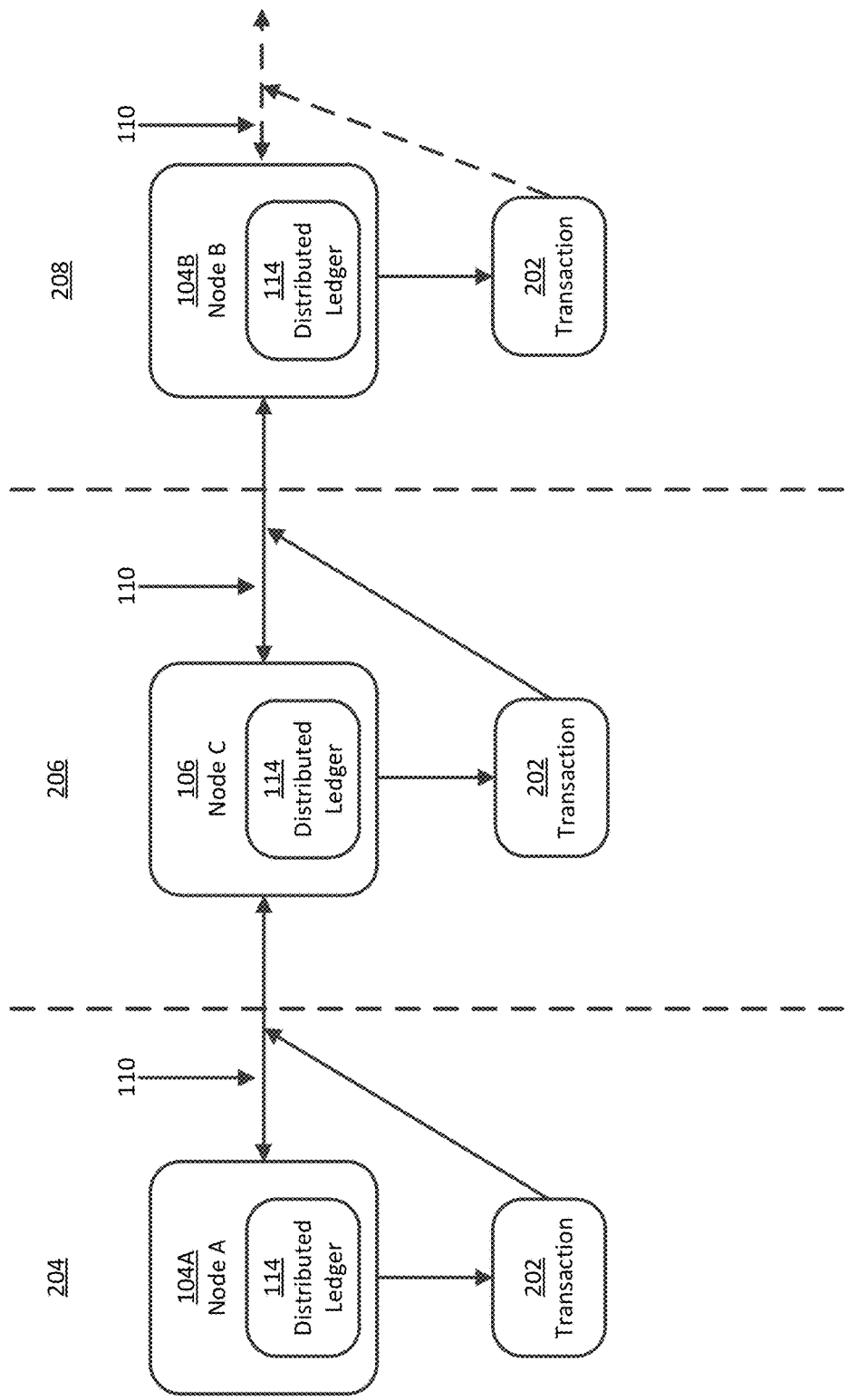
FIG. 2A depicts an exemplary transaction flow 200 in accordance with one aspect of the present disclosure.

FIG. 2A depicts an exemplary transaction flow 200 in accordance with one aspect of the present disclosure. FIG. 2A includes a transaction 202, three different time frames 204, 206, and 208, a set of nodes, network connections 110, and a distributed ledger 114. The transaction flow 200 may represent a sequential flow of a transaction through a network, such as the network depicted in FIG. 1B. For example, at time 204 Node A 104A generates a transaction 202.

The transaction 202 may use data that is stored in the distributed ledger 114, or the transaction 202 may use data received by the node from outside the distributed ledger 114. Node A 104A may transmit the newly generated transaction to Node C 106 via the network connection 110. At time 206, Node C 106 receives the transaction 202 and confirms that the information contained therein is correct. If the information contained in the transaction 202 is not correct Node C 106 may reject the transaction and not propagate the transaction 202 through the system. If the information contained in the transaction 202 is correct Node C 106 may transmit the transaction 202 to its neighbor Node B 104B.

Similarly, at time 208 Node B 104B may receive the transaction 202 and either confirm or reject the transaction 202. In some embodiments, the Node B 104B may not transmit the confirmed transaction 202, because there are no further nodes to transmit to, or all the nodes in the network have already received transaction 202.

In some embodiments, at any of time frames 204, 206, or 208, any of the nodes may add the confirmed transaction 202 to their copy of the distributed ledger 114, or to a block of transactions stored in the distributed ledger. In some embodiments, confirming the transaction 202 includes checking a cryptographic key-pair for participants involved in the transaction 202. Checking the cryptographic key-pair may follow a set method laid out by a consensus protocol, such as the consensus protocol discussed in FIG. 1B.

Figure 2B:
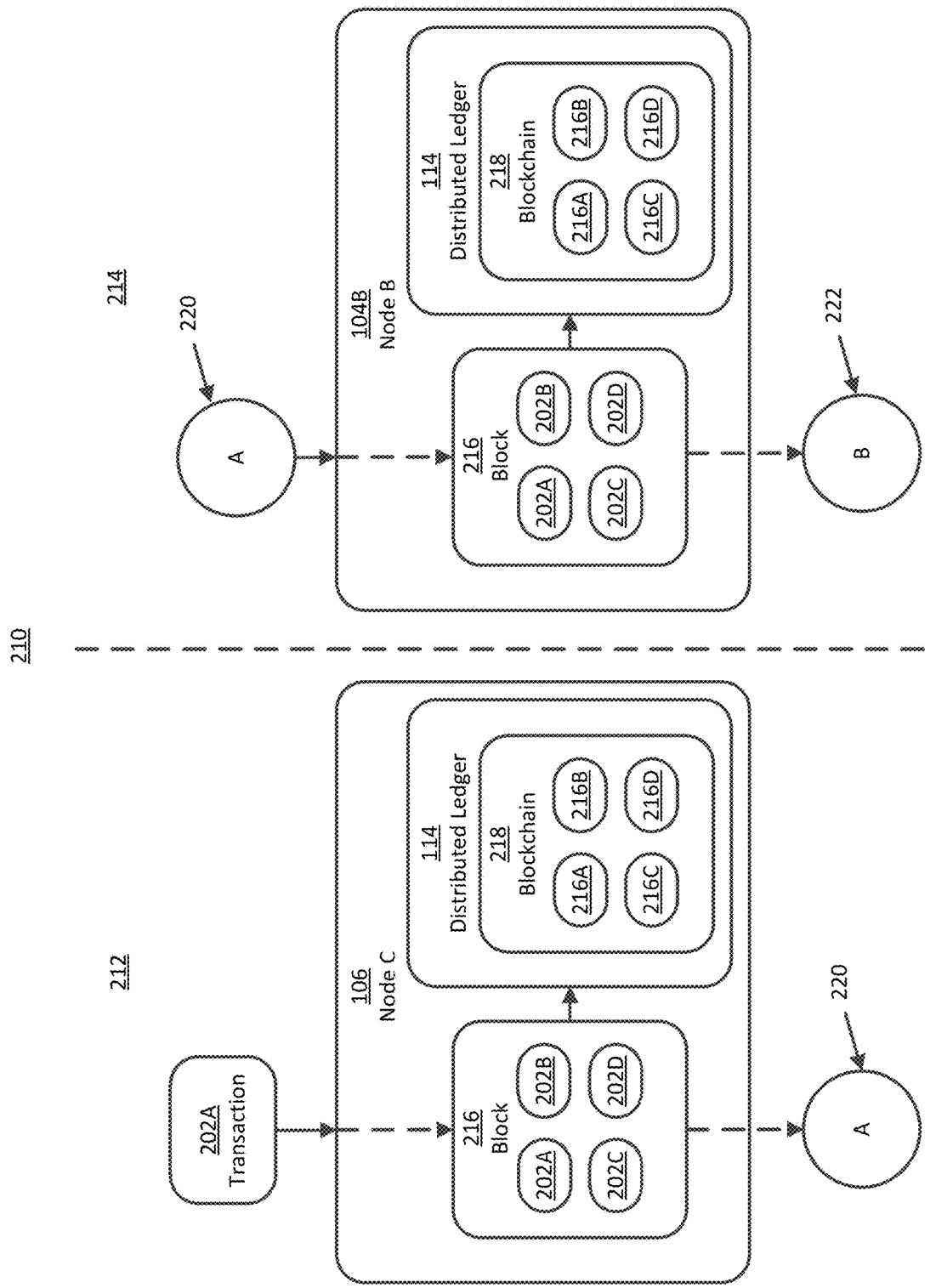
FIG. 2B depicts an exemplary block propagation 210 in accordance with one aspect of the present disclosure.

FIG. 2B depicts an exemplary block propagation 210 in accordance with one aspect of the present disclosure. FIG. 2B includes two time frames 212 and 214, Node C 106 and Node B 104B, a set of transactions 202A-202D, a set of blocks of transactions 216A-216D, a distributed ledger 114, and a blockchain 218. The block propagation 210 may follow the blockchain system described above, or may follow another blockchain propagation algorithm.

The block propagation 210 may begin with Node C 106 receiving transaction 202A at time 212. When Node C 106C confirms that transaction 202A is valid, the node may add the transaction to a newly generated block 216. As part of adding the transaction 202A to block 216, Node C 106 may solve a cryptographic puzzle and include the solution in the newly generated block 216 as proof of the work done to generate the block 216. This proof of work may be similar to the proof of work described above which utilizes guessing a nonce value. In other embodiments, the transaction 202A may be added to a pool of transactions until enough transactions exist to add together to create a block. Node C 106 may transmit the newly created block 216 to the network at 220. Before or after propagating the block 216, Node C 106 may add the block 216 to its copy of the blockchain 218.

At time 214 Node B 104B may receive the newly created block 216. Node B 104B may verify that the block of transactions 216 is valid by checking the solution to the cryptographic puzzle provided in the block 216. If the solution is accurate then Node B 104B may add the block 216 to its blockchain 218 and transmit the block 216 to the rest of the network at 222.

Exemplary Sequence Diagram

Figure 3:
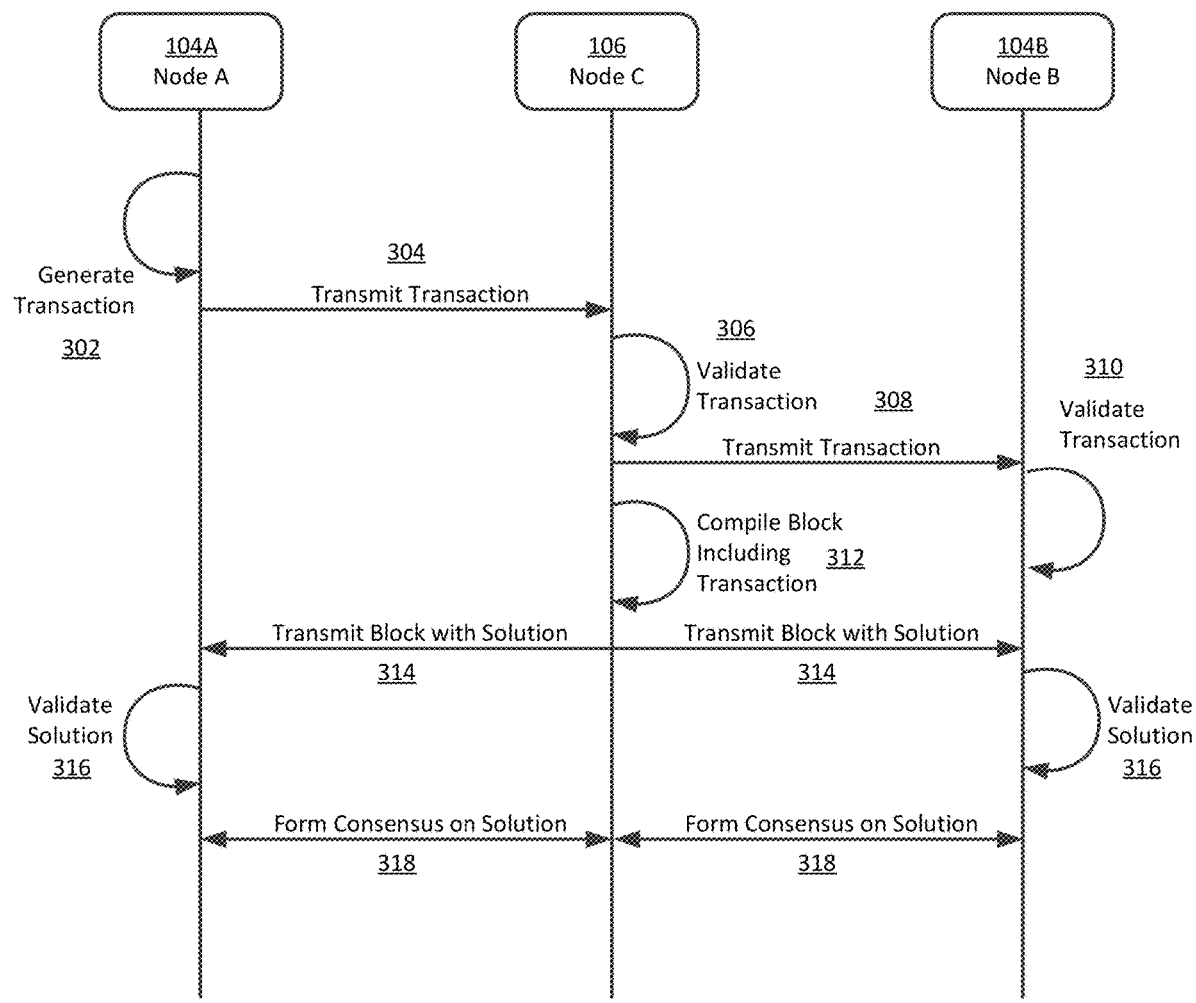
FIG. 3 depicts an exemplary sequence diagram 300 in accordance with one aspect of the present disclosure.

FIG. 3 depicts an exemplary sequence diagram 300 in accordance with one aspect of the present disclosure. FIG. 3 includes a set of nodes 104A, 104B, and 106. At 302, Node A 104A may generate a transaction. The transaction may be transmitted from Node A 104A to Node C 106 at 304. Node C 106 may validate the transaction at 306, and if the transaction is valid, transmit the transaction at 308 to Node B 104B. Node B 104B may validate the transaction at 310. At 312, Node C 106 may compile a block at 312 including the validated transaction. Compiling a block may include generating a solution to a cryptographic puzzle, and linking the block to other blocks, as described in the embodiments above. Once the block is compiled, Node C 106 may transmit the block with the solution at 314 to both Node A 104A and Node B 104B.

Both nodes may then validate the solution to the block at 316. Verifying may include checking a cryptographic key-pair as described above. At 318 the three nodes form a consensus that the solution is valid, and accordingly all the nodes have formed a consensus on the blocks of transactions stored by all the nodes.

Exemplary Node

Figure 4:
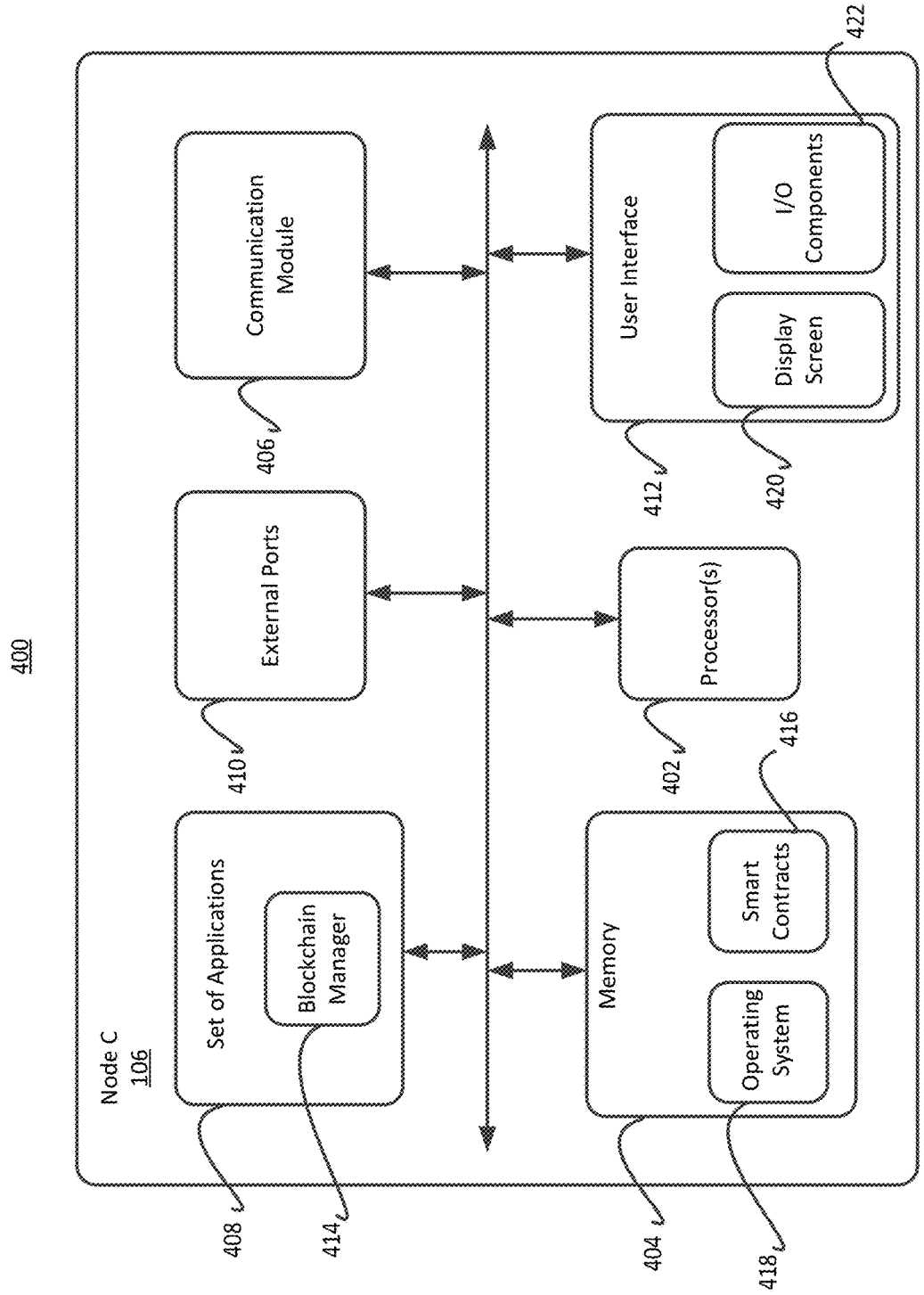
FIG. 4 depicts an exemplary node 400 in accordance with one aspect of the present disclosure.

FIG. 4 depicts an exemplary node 400 in accordance with one aspect of the present disclosure. In some embodiments, node 400 may be the same type of node as Node C 106 in FIGS. 1A-3. In other embodiments, node 400 may be the same type of node as Node A 104A and Node B 104B in FIGS. 1A-3. Node 400 may be capable of performing all the embodiments disclosed herein. In particular, node 400 may utilize the decentralized system described in FIG. 1B, the flows of transactions and blocks described in FIGS. 2A and 2B, and the blockchain system 500 described below in FIG. 5.

FIG. 4 includes at least one processor 402, memory 404, a communication module 406, a set of applications 408, external ports 410, user interface 412, a blockchain manager 414, smart contracts 416, operating system 418, a display screen 420, and input/output components 422. In some embodiments, the node 400 may generate a new block of transactions by using the blockchain manager 414. Similarly, the node 400 may use the blockchain manager 414 in conjunction with the smart contracts 416 stored in memory 404 to execute the functionality disclosed herein.

In other embodiments, the smart contracts 416 operate independent of the blockchain manager 414 or other applications. In some embodiments, node 400 does not have a blockchain manager 414, or smart contracts 416 stored at the node. In some embodiments, the node 400 may have additional or less components than what is described. The components of the node 400 are described in more detail below.

The node 400, as part of a decentralized ledger system 112, or another decentralized or centralized network, may be used to handle systems that interact with and manipulate data and transactions designed for banking identity authentication, banking account funding and distribution, banking card activation, actions triggered by a death registry, using and accessing asset data, lien perfection, obtaining settlement values, contractor ratings, single view of customer's products, and associate licensing.

Exemplary Blockchain System

Figure 5:
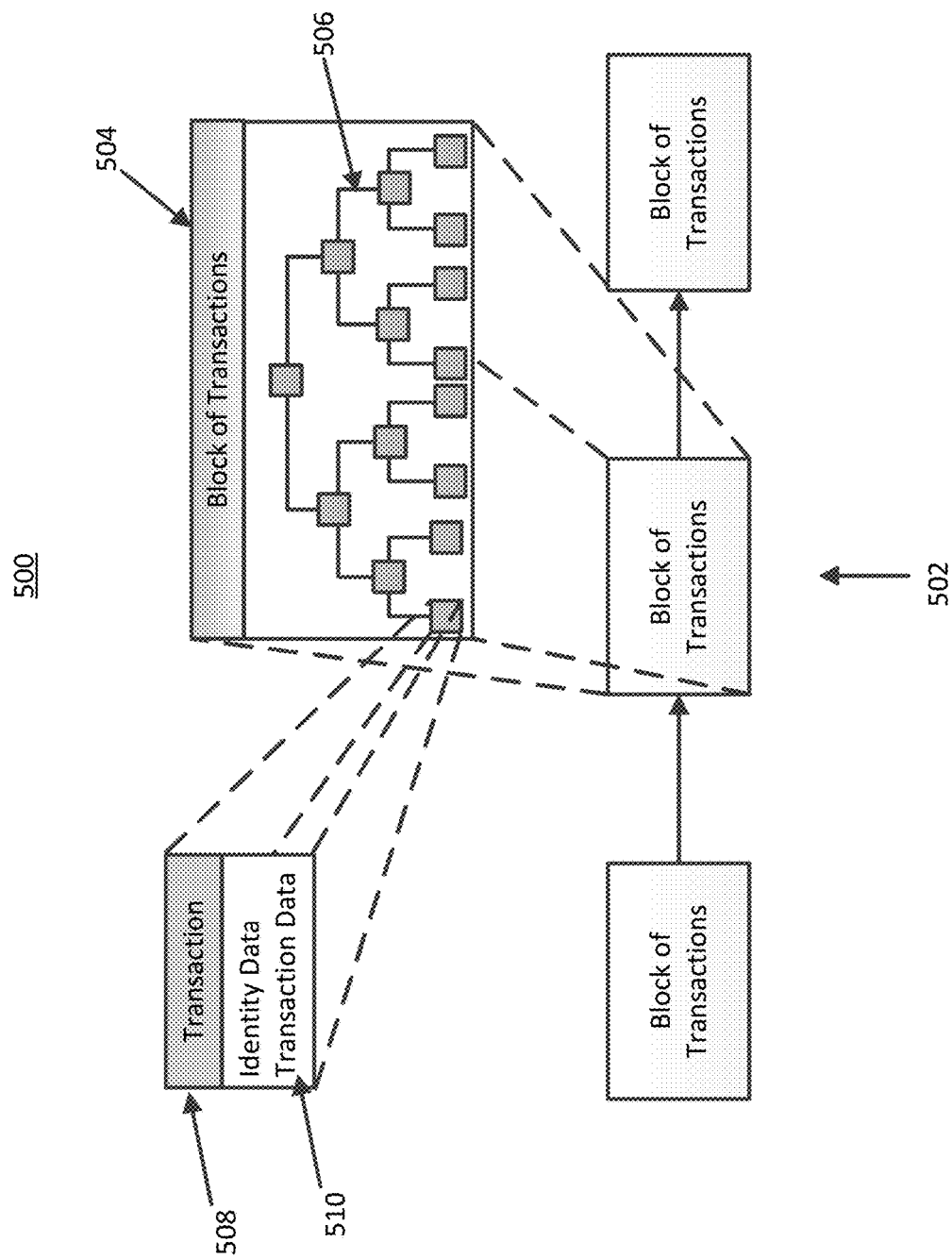
FIG. 5 depicts an exemplary blockchain 500 in accordance with one aspect of the present disclosure.

FIG. 5 depicts an exemplary blockchain system 500 in accordance with one aspect of the present disclosure. FIG. 5 includes a blockchain 502, a block of transactions 504, a Merkle Tree 506, and a transaction 508. The Merkle Tree may be the same Merkle Tree described above that cryptographically links transactions together. In other embodiments, the blockchain system 500 may utilize a different method of organizing transactions in a block. In some embodiments, the blockchain system 500 includes a plurality of blocks connected together to form a chain of blocks of transactions 502.

Each block of transactions 504 may include at least one transaction 508. In other embodiments, each block of transactions 504 has a size limit that necessarily limits the number of transactions that the block may store. Each block of transactions 504 includes a reference to a previous block of transactions that was added to the blockchain 502 prior to the block of transactions 504 being added to the blockchain 502. As such, and as described above, each block of transactions 504 is linked to every other block in the blockchain 502.

In some embodiments, the block of transactions 504 may organize the transactions it has received into a Merkle Tree 506 to facilitate access to the stored transactions. The transactions may be hashed using a cryptographic hash algorithm, such as the algorithms discussed above, and the hash of each transaction is stored in the tree. As the tree is constructed the hash of each adjacent node is hashed together to create a new node that exists at a higher level in the tree. Therefore, the root of the tree, or the node at the top of the tree, is dependent upon the hash of each transaction stored in the tree. Each transaction 508 may include a set of data 510. The set of data 510 may include identifying data for the transaction, and transaction data identifying the nature of the transaction and what the transactions entails.

Exemplary Banking Identity Authentication

Figure 6:
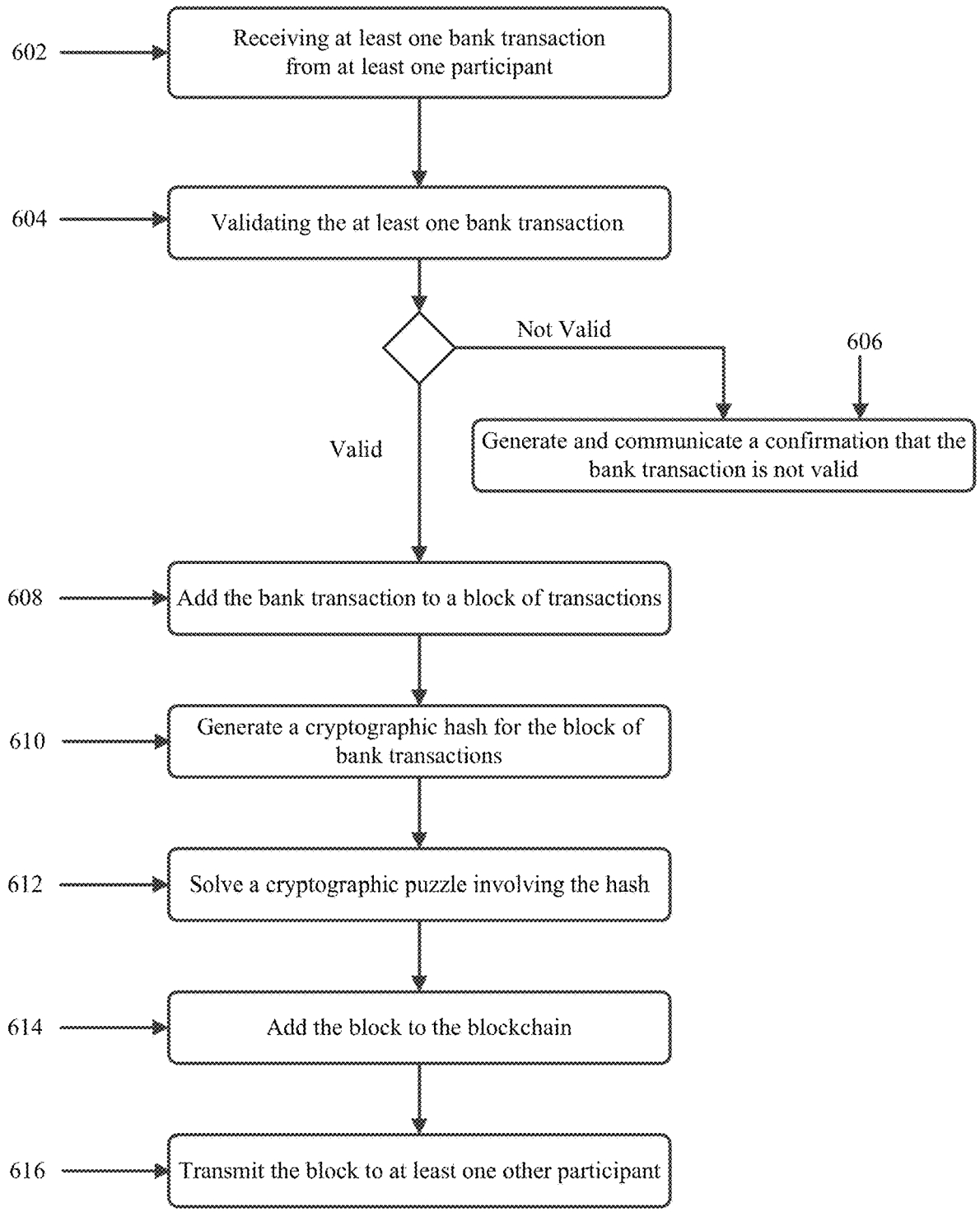
FIG. 6 depicts an exemplary flow diagram 600 associated with one aspect of the present disclosure.

FIG. 6 depicts an exemplary flow diagram 600 for a computer-implemented method for manipulating and accessing a blockchain containing identity authentication information for banking services maintained by a network of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the method 600 may be performed by the nodes in the network of participants, such as the nodes described in FIGS. 1A-4. The method 600 may include additional, fewer, or alternative actions, including those described elsewhere herein.

The exemplary flow diagram 600 includes receiving at least one bank transaction from at least one participant (block 602). Verifying the at least one bank transaction (block 604). When the transaction is not valid, generating and communicating a confirmation that the bank transaction is not valid (block 606), or alternatively, when the transaction is valid, adding the bank transaction to a block of transactions (block 608). Generating a cryptographic hash for the block of bank transactions (block 610). Solving a cryptographic puzzle involving the generated hash (block 612), adding the block to the blockchain (block 614), and transmitting the block to at least one other participant.

Exemplary Banking Account Funding and Distribution

Figure 7:
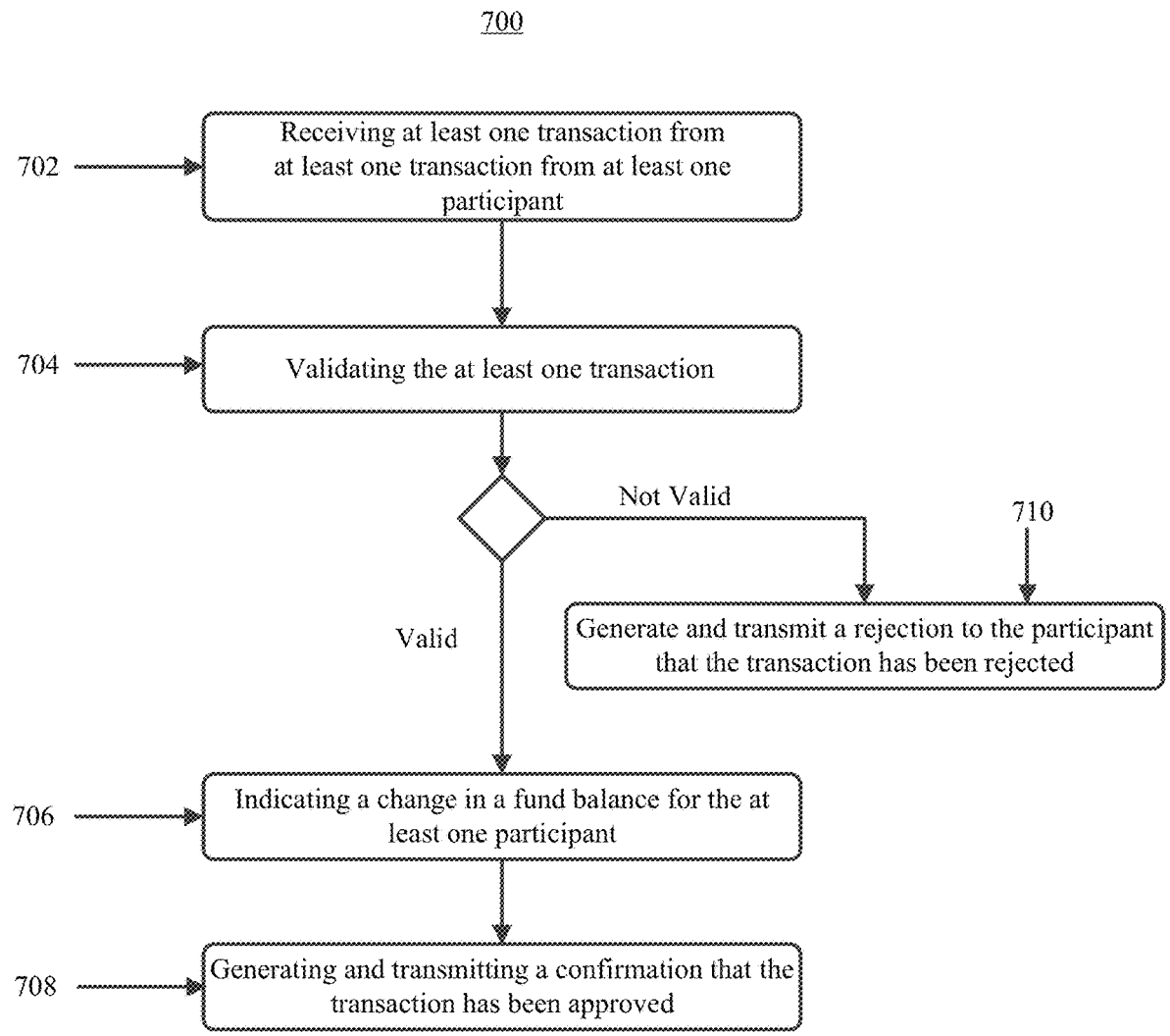
FIG. 7 depicts an exemplary flow diagram 700 associated with one aspect of the present disclosure.

FIG. 7 depicts an exemplary flow diagram 700 for a computer-implemented method for account funding and distribution using smart contracts stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the computer-implemented method 700 may be performed by the nodes in the network of participants, such as the nodes described in FIGS. 1A-4. The method 700 may include additional, fewer, or alternative actions, including those described elsewhere herein.

The systems and methods described herein may help an individual and a business manage the account funding and distribution process using smart contracts stored on a blockchain maintained by a plurality of participants. For example, a business (e.g., a bank) may have a smart contract stored on a blockchain that automates the process of adding/subtracting/distributing funds to/from an account. That smart contract may be stored at a particular address in the blockchain that allows participants in the blockchain network to send funds and other data in a transaction to that address. The smart contract may have particular conditions that must be met for particular actions to take place. Assuming that the conditions in the smart contract are met, when a transaction is sent to the address where the smart contract is stored, the particular actions are executed.

The particular actions may be, for example, a customer of a bank wishing to send money to their checking with the bank. The customer may send a transaction with an amount of money, as well as their account information and any validating information for the account, to the address where the smart contract is stored. Once the information in the transaction is confirmed by the participants in the blockchain network as adhering to the conditions dictated in the smart contract the funds may be added/subtracted/disbursed to/from the customer's account. Other actions may be performed using the smart contracts stored in the blockchain network, such as for example: transferring accounts, linking accounts to each other, allowing reporting or monitoring of accounts, and deleting accounts.

The exemplary flow diagram 700 may include, via one or more processors, servers, and/or transceivers, (1) receiving (such as via wireless communication or data transmission over one or more radio frequency links or communication channels) at least one transaction from at least one participant, wherein the at least one transaction has a set of parameters (block 702); (2) verifying the at least one transaction, wherein verifying includes accessing a smart contract stored on the blockchain and checking the set of parameters against a set of conditions stored in the smart contract (block 704); and, (3) when the set of parameters satisfy the set of conditions, indicating a change in a fund balance for the at least one participant (block 706), and (4) generating and transmitting (such as via wireless communication or data transmission over one or more radio frequency links or communication channels) a confirmation to the at least one participant that the transaction has been approved (block 708). And, (5) alternatively, when the set of parameters do not satisfy the set of conditions, the flow may include, via one or more processors, servers, and/or transceivers, generating and transmitting (such as via wireless communication or data transmission over one or more radio frequency links or communication channels) a rejection to the at least one participant that the transaction has been rejected (block 710).

In some embodiments, the at least one transaction is a new account funding transaction. As part of the new account funding transaction a participant in the blockchain network may include funds in the transaction as well as other information necessary for the transaction. The funds may be added to the transaction by the participant that initiated the transaction, or may be added to the transaction by another participant on the blockchain network. In some embodiments, the set of parameters contained in the transaction include personally identifiable information for at least one person and an amount of funds. Examples of personally identifiable information may include a person's full name, a person's address information, a person's age, or other identifying information about the person.

In some embodiments, the set of conditions may be a list of requirements for funding an account stored on the blockchain corresponding to the transaction, and verifying that the at least one participant has ownership of an amount of funds being used to fund the account. The requirements may include particular information required by a financial institution to comply with regulations, such as, know your customer regulations and anti-money laundering regulations. Accordingly, when there is no account stored on the blockchain corresponding to the transaction, the method may include creating a new account on the blockchain for the at least one participant using the funds included in the transaction.

In some embodiments, indicating a change in a fund balance for the at least one participant, may include adding funds included in the transaction to an account controlled by the at least one participant. In other embodiments, the method may further include receiving (such as via wireless communication or data transmission over one or more radio frequency links or communication channels) a block of transactions; verifying the block of transactions; transmitting (such as via wireless communication or data transmission over one or more radio frequency links or communication channels) the block of transactions to at least one other participant; and/or adding the block of transactions to a copy of the blockchain. Verifying the block may include solving a cryptographic puzzle, and including the solution to the cryptographic puzzle in the block of transactions.

In some embodiments of the method for account funding and distribution using smart contracts stored on a blockchain maintained by a plurality of participants, the method may include receiving (such as via wireless communication or data transmission over one or more radio frequency links or communication channels) a request for funds from at least one participant, wherein the request for funds has a set of parameters; verifying the request for funds, wherein verifying may include accessing a smart contract stored on the blockchain and checking the set of parameters against a set of conditions stored in the smart contract; and when the set of parameters satisfy the set of conditions, satisfying the request for funds by transmitting (such as via wireless communication or data transmission over one or more radio frequency links or communication channels) the corresponding amount of funds to the at least one participant; generating and transmitting (such as via wireless communication or data transmission over one or more radio frequency links or communication channels) a confirmation to the at least one participant that the request for funds has been approved; generating a block of transactions representative of requests for funds containing the at least one request for funds, and transmitting (such as via wireless communication or data transmission over one or more radio frequency links or communication channels) the block of transactions to at least one participant; and, alternatively, when the set of parameters do not satisfy the set of conditions, generating and transmitting (such as via wireless communication or data transmission over one or more radio frequency links or communication channels) a rejection to the at least one participant that the request for funds has been rejected. The methods may include additional, less, or alternate actions, including that discussed elsewhere herein.

Exemplary Banking Card Activation

Figure 8:
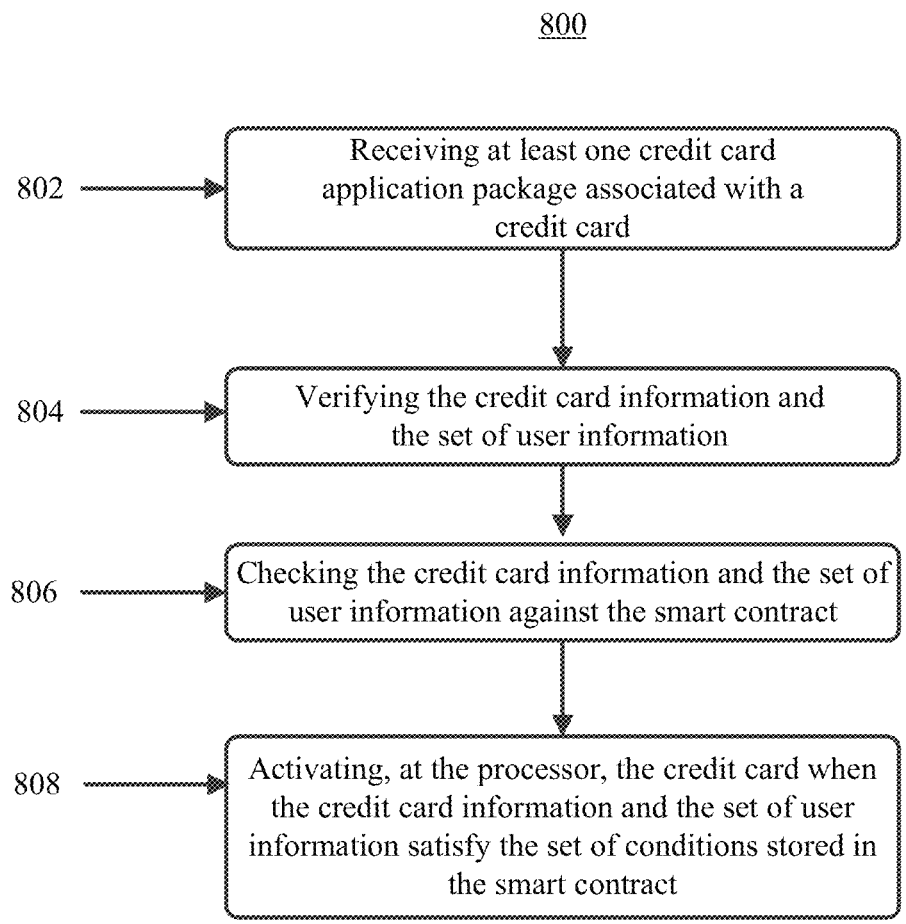
FIG. 8 depicts an exemplary flow diagram 800 associated with one aspect of the present disclosure.

FIG. 8 depicts an exemplary flow diagram 800 for a computer-implemented method for credit card activation using a smart contract stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the method 800 may be performed by the nodes in the network of participants, such as the nodes described in FIGS. 1A-4. The method 800 may include additional, fewer, or alternative actions, including those described elsewhere herein.

The exemplary flow diagram 800 includes receiving, at a processor, at least one credit card application package associated with a credit card, wherein the credit card application package includes credit card information and a set of user information (block 802). Verifying, at the processor, the credit card information and the set of user information (block 804). Checking, at the processor, the credit card information and the set of user information against the smart contract stored on the blockchain, wherein the smart contract includes a set of conditions (block 806). Activating, at the processor, the credit card when the credit card information and the set of user information satisfy the set of conditions stored in the smart contract (block 808).

Exemplary Actions Triggered by a Passing Registry

Figure 9:
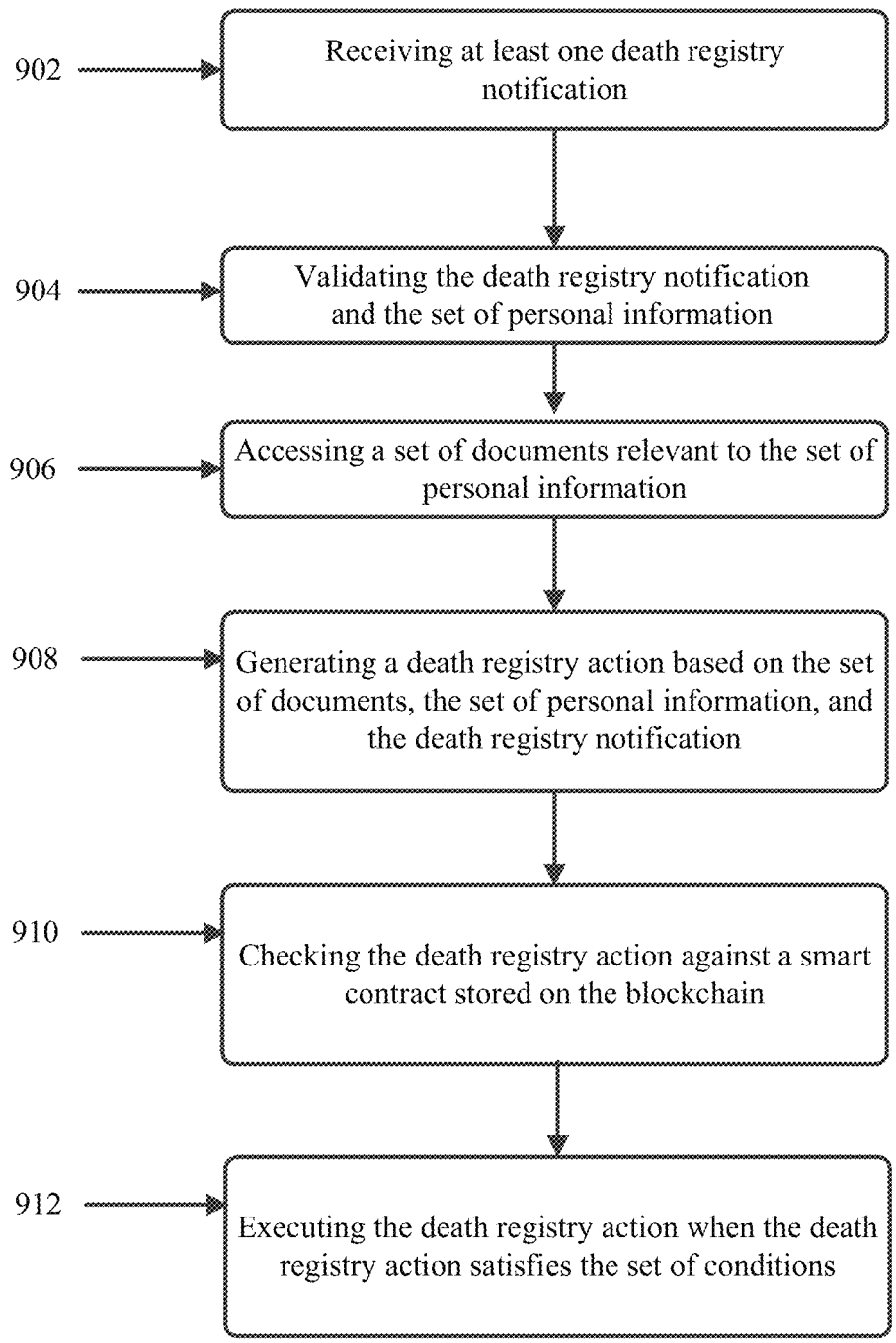
FIG. 9 depicts an exemplary flow diagram 900 associated with one aspect of the present disclosure.

FIG. 9 depicts an exemplary flow diagram 900 for a computer-implemented method for performing actions designated in smart contracts, stored on a blockchain maintained by a plurality of participants, based upon notification of a person's death or passing. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the method 900 may be performed by the nodes in the network of participants, such as the nodes described in FIGS. 1A-4. The method 900 may include additional, fewer, or alternative actions, including those described elsewhere herein.

The exemplary flow diagram 900 includes receiving, at a processor coupled with a network interface, at least one passing or death registry notification, wherein the passing or death registry notification has a set of personal information (block 902). Verifying, at the processor, the passing or death registry notification and the set of personal information (block 904). Accessing, at the processor, a set of documents relevant to the set of personal information (block 906). Generating, at the processor, a passing or death registry action based upon the set of documents, the set of personal information, and the passing or death registry notification (block 908). Checking, at the processor, the passing or death registry action against a smart contract stored on the blockchain, wherein the set of documents has a set of conditions (block 910). Executing, at the processor, the passing or death registry action when the passing or death registry action satisfies the set of conditions (block 912).

Exemplary Using and Accessing Asset Data

Figure 10:
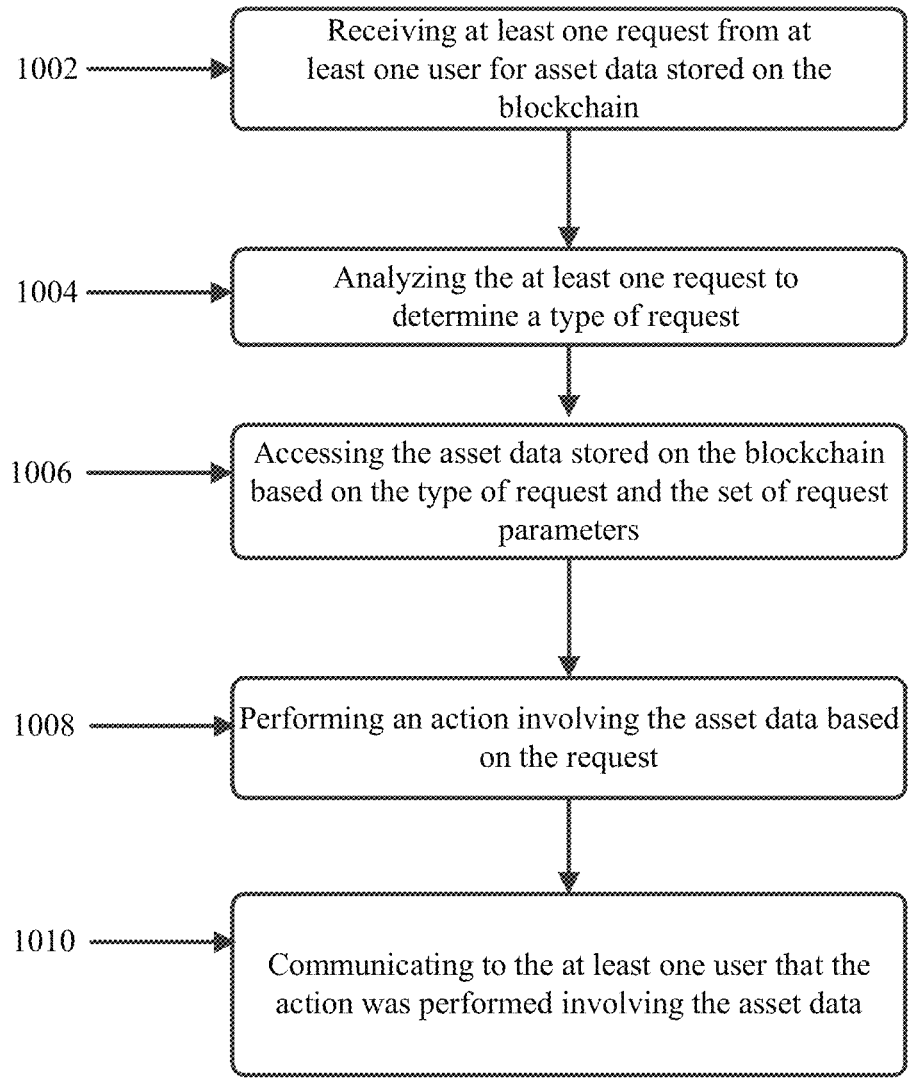
FIG. 10 depicts an exemplary flow diagram 1000 associated with one aspect of the present disclosure.

FIG. 10 depicts an exemplary flow diagram 1000 for a computer-implemented method for using and accessing asset data stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the method 1000 may be performed by the nodes in the network of participants, such as the nodes described in FIGS. 1A-4. The method 1000 may include additional, fewer, or alternative actions, including those described elsewhere herein.

The exemplary flow diagram 1000 may include receiving, at a processor coupled to a network interface, at least one request from at least one user for asset data stored on the blockchain, wherein the request includes a set of request parameters (block 1002). Analyzing, at the processor, the at least one request to determine a type of request (block 1004). Accessing, at the processor, the asset data stored on the blockchain based upon the type of request and the set of request parameters (block 1006). Performing, at the processor, an action involving the asset data based upon the request (block 1008). Communicating, via the processor coupled to the network interface, to the at least one user that the action was performed involving the asset data (block 1010).

Exemplary Lien Perfection

Figure 11:
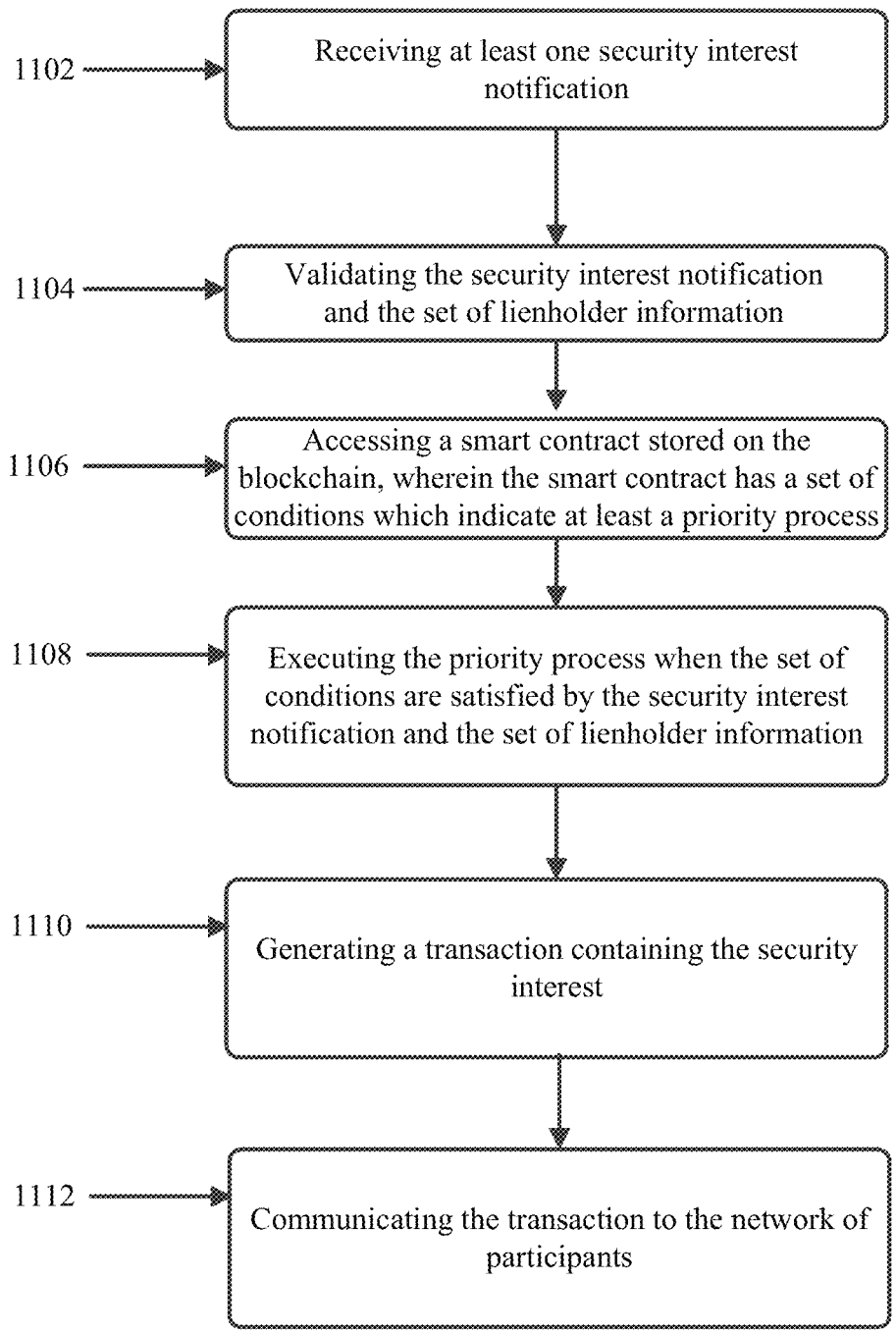
FIG. 11 depicts an exemplary flow diagram 1100 associated with one aspect of the present disclosure.

FIG. 11 depicts an exemplary flow diagram 1100 for a computer-implemented method for lien perfection using smart contracts stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the method 1100 may be performed by the nodes in the network of participants, such as the nodes described in FIGS. 1A-4. The method 1100 may include additional, fewer, or alternative actions, including those described elsewhere herein.

The exemplary flow diagram 1100 includes receiving, at a processor coupled with a network interface, at least one security interest notification, wherein the security interest notification has a set of lienholder information for an asset (block 1102). Verifying, at the processor, the security interest notification and the set of lienholder information (block 1104). Accessing, at the processor, a smart contract stored on the blockchain, wherein the smart contract has a set of conditions which indicate at least a priority process (block 1106). Executing, at the processor, the priority process when the set of conditions are satisfied by the security interest notification and the set of lienholder information (block 1108). Generating, at the processor, a transaction containing the security interest (block 1110). Communicating, via the processor coupled with the network interface, the transaction to the network of participants (block 1112).

Exemplary Obtaining Settlement Values

Figure 12:
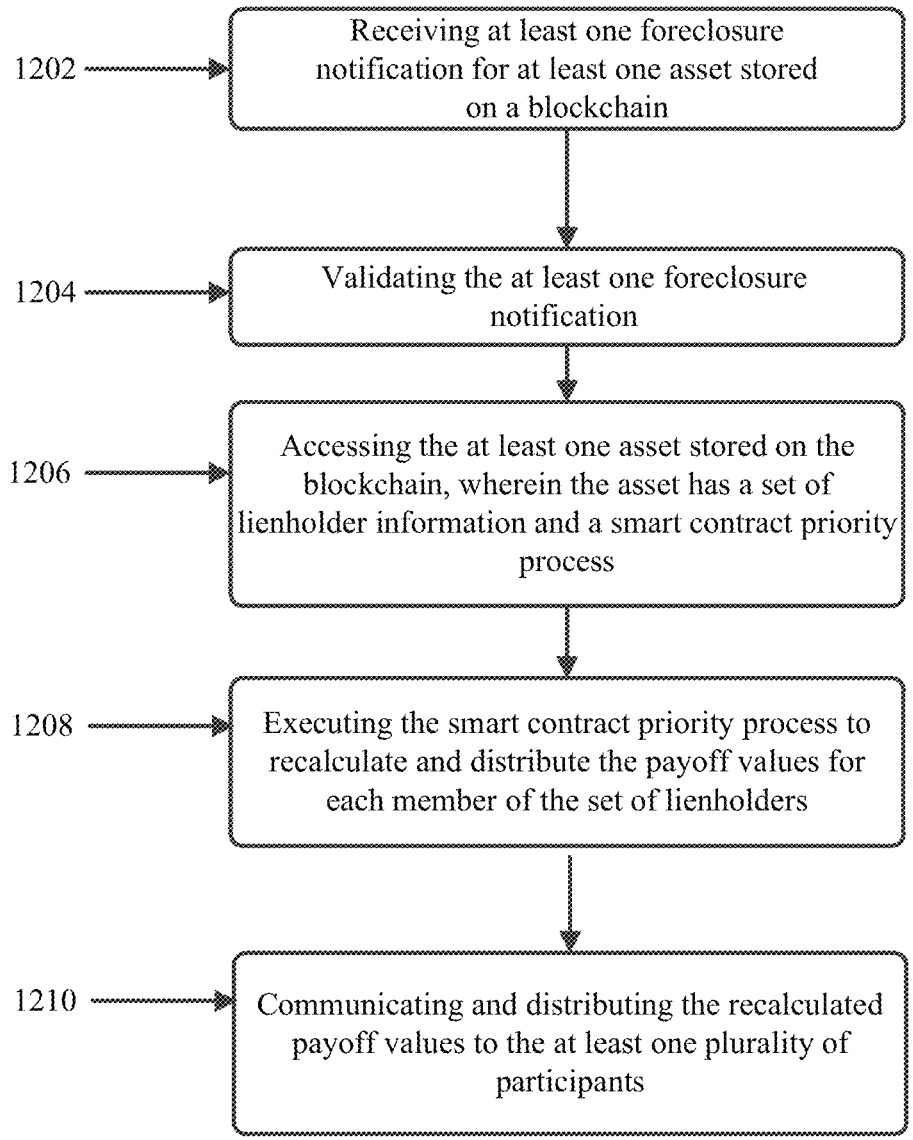
FIG. 12 depicts an exemplary flow diagram 1200 associated with one aspect of the present disclosure.

FIG. 12 depicts an exemplary flow diagram 1200 for a computer-implemented method for obtaining settlement values for a set of lienholders with a security interest in an asset stored on a blockchain maintained by a plurality of participants using smart contracts. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the method 1200 may be performed by the nodes in the network of participants, such as the nodes described in FIGS. 1A-4. The method 1200 may include additional, fewer, or alternative actions, including those described elsewhere herein.

The exemplary flow diagram 1200 includes receiving, at a processor coupled with a network interface, at least one foreclosure notification for at least one asset stored on a blockchain, wherein the at least one foreclosure notification includes at least one request for a set of settlement values from one of the plurality of participants (block 1202). Verifying, at the processor, the at least one foreclosure notification (block 1204). Accessing, at the processor, the at least one asset stored on the blockchain, wherein the asset has a set of lienholder information and a smart contract priority process, wherein the smart contract priority process indicates the settlement values for each member of the set of lienholders (block 1206). Executing, at the processor, the smart contract priority process to recalculate and distribute the settlement values for each member of the set of lienholders (block 1208). Communicating and distributing, via the processor coupled with the network interface, the recalculated settlement values to the at least one plurality of participants that requested the set of settlement values (block 1210).

Exemplary Contractor Ratings

Figure 13:
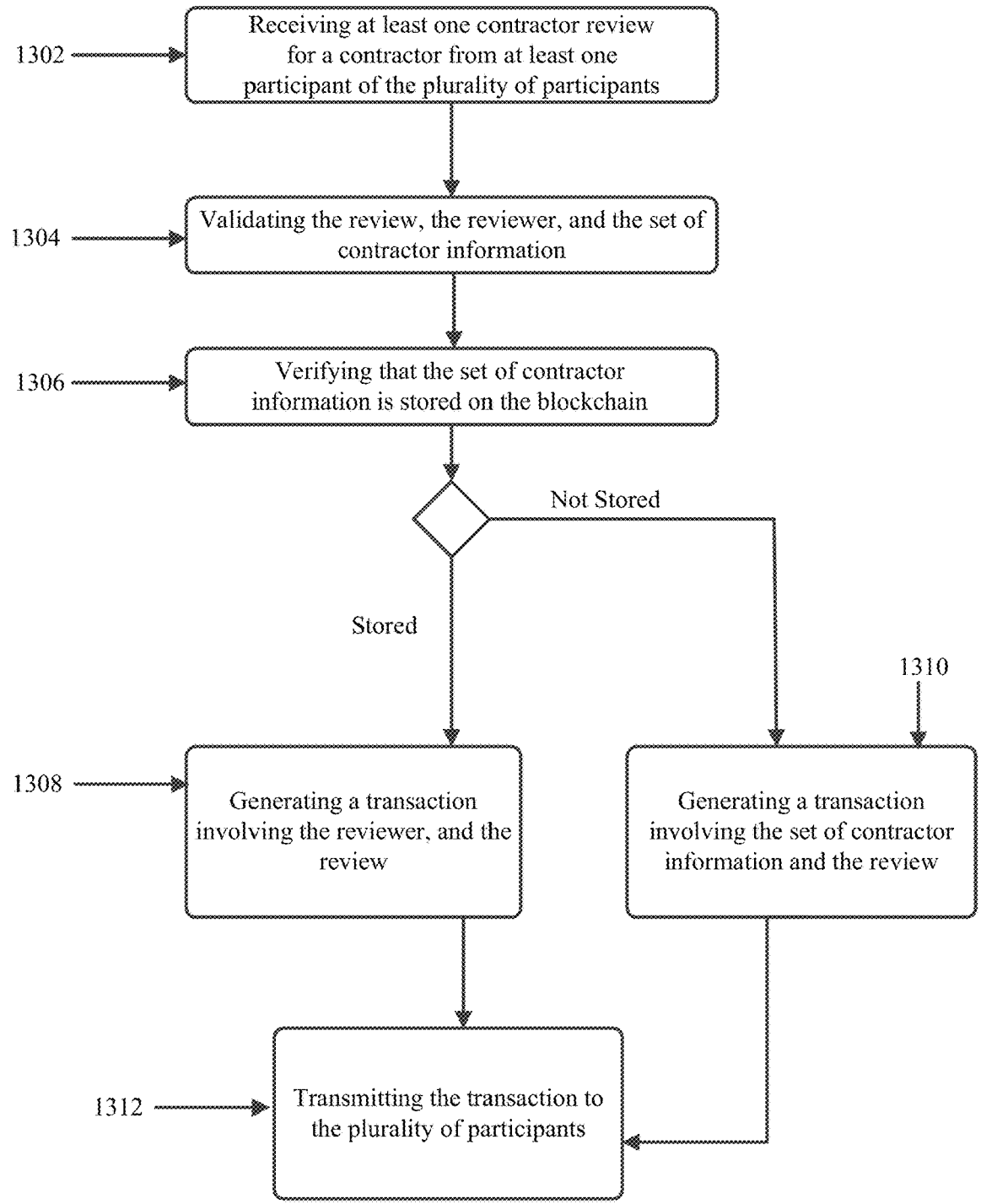
FIG. 13 depicts an exemplary flow diagram 1300 associated with one aspect of the present disclosure.

FIG. 13 depicts an exemplary flow diagram 1300 for a computer-implemented method for using and accessing contractor evaluations stored on a blockchain maintained by a plurality of participants In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the method 1300 may be performed by the nodes in the network of participants, such as the nodes described in FIGS. 1A-4. The method 1300 may include additional, fewer, or alternative actions, including those described elsewhere herein.

The exemplary flow diagram 1300 includes receiving, at a processor coupled to a network interface, at least one contractor evaluation for a contractor from at least one participant of the plurality of participants, wherein the at least one contractor evaluation includes an evaluation, an evaluationer, and a set of contractor information (block 1302). Verifying, at the processor, the evaluation, the evaluationer, and the set of contractor information (block 1304). Verifying, at the processor, that the set of contractor information is stored on the blockchain (block 1306). When the set of contractor information is stored on the blockchain, generating, at the processor, a transaction involving the set of contractor information and the evaluation (block 1308), and when the set of contractor information is not stored on the blockchain, generating, at the processor, a transaction involving the set of contractor information and the evaluation (block 1310). Transmitting, via the processor coupled to the network interface, the transaction to the plurality of participants (block 1312).

Exemplary Single View of Customer's Products

Figure 14:
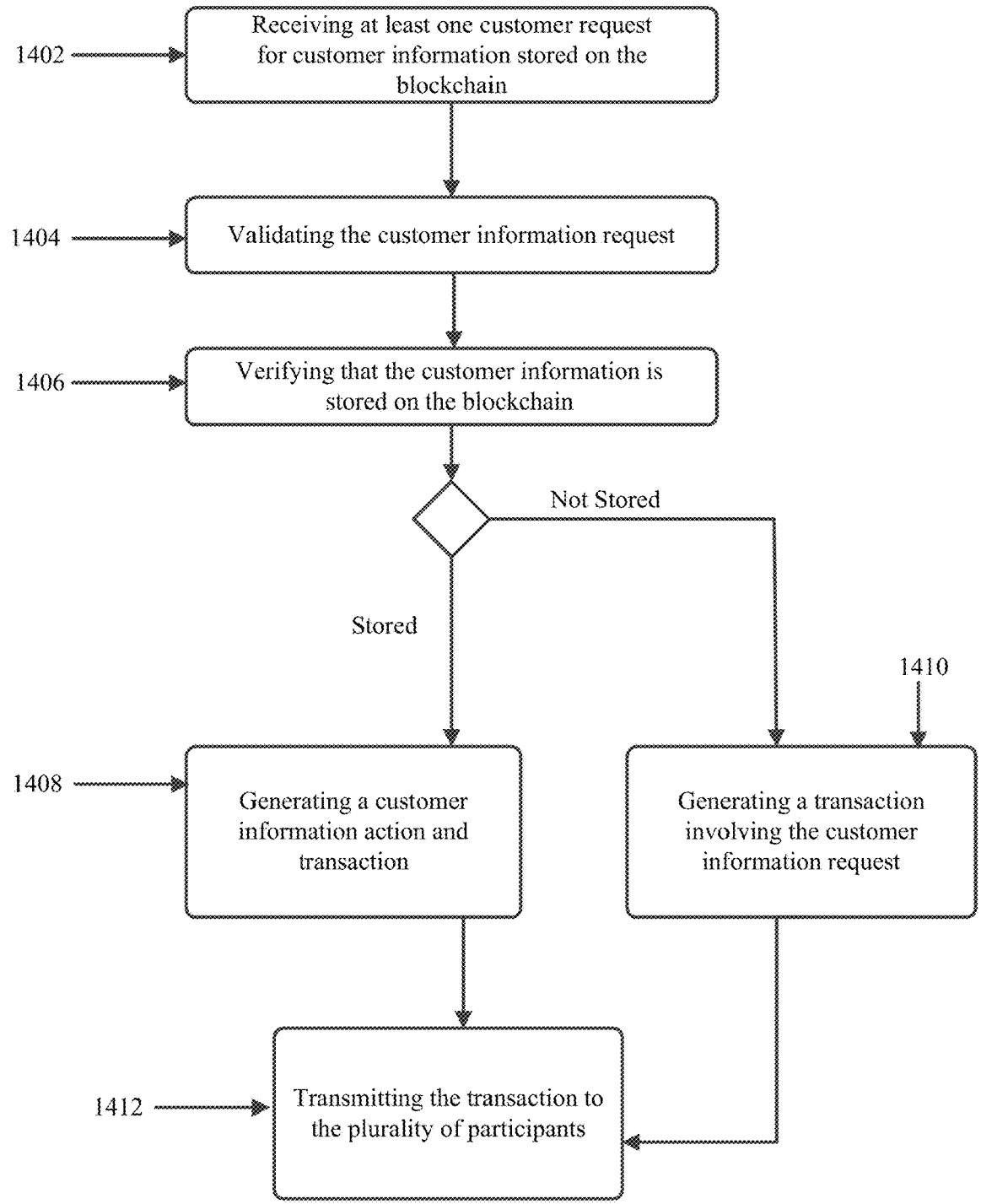
FIG. 14 depicts an exemplary flow diagram 1400 associated with one aspect of the present disclosure.

FIG. 14 depicts an exemplary flow diagram 1400 for a computer-implemented method for using and accessing customer information stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the method 1400 may be performed by the nodes in the network of participants, such as the nodes described in FIGS. 1A-4. The method 1400 may include additional, fewer, or alternative actions, including those described elsewhere herein.

The exemplary flow diagram 1400 includes receiving, at a processor coupled to a network interface, at least one customer request for customer information stored on the blockchain from at least one participant of the plurality of participants (block 1402). Verifying, at the processor, the customer information request (block 1404). Verifying, at the processor, that the customer information is stored on the blockchain (block 1406), and when the customer information is stored on the blockchain generating, at the processor, a customer information action and transaction (block 1408), and when the customer information is not stored on the blockchain, generating, at the processor, a transaction involving the customer information request (block 1410). Transmitting, via the processor coupled to the network interface, the transaction to the plurality of participants (block 1412).

Exemplary Associate Information and Licensing

Figure 15:
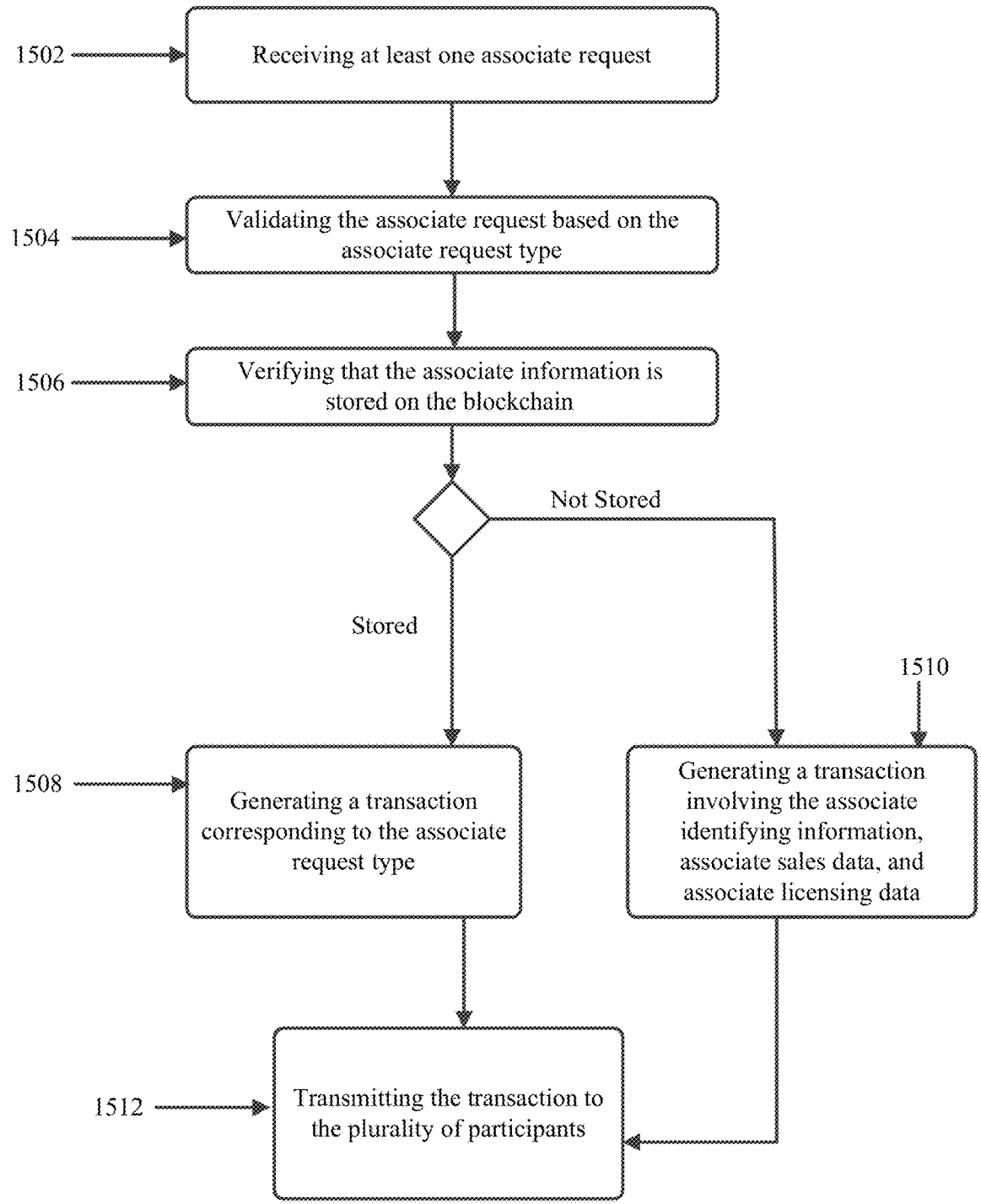
FIG. 15 depicts an exemplary flow diagram 1500 associated with one aspect of the present disclosure.

FIG. 15 depicts an exemplary flow diagram 1500 for a computer-implemented method for using and accessing associate data stored on a blockchain maintained by a plurality of participants In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the method 1500 may be performed by the nodes in the network of participants, such as the nodes described in FIGS. 1A-4. The method 1500 may include additional, fewer, or alternative actions, including those described elsewhere herein.

The exemplary flow diagram 1500 includes receiving, at a processor coupled to a network interface, at least one associate request, the associate request having an associate request type, from at least one participant of the plurality of participants for information on an associate stored on the blockchain, wherein the at least one associate request includes associate identifying information, associate sales data, and associate licensing data (block 1502). Verifying, at the processor, the associate request based upon the associate request type (block 1504). Verifying, at the processor, that the associate information is stored on the blockchain (block 1506). When the associate information is stored on the blockchain, generating, at the processor, a transaction corresponding to the associate request type (block 1508), and when the associate information is not stored on the blockchain, generating, at the processor, a transaction involving the associate identifying information, associate sales data, and associate licensing data (block 1510). Transmitting, via the processor coupled to the network interface, the transaction to the plurality of participants (block 1512).

Additional Considerations

This detailed description is to be construed as exemplary only and does not describe every possible embodiment, as describing every possible embodiment would be impractical, if not impossible. One may be implement numerous alternate embodiments, using either current technology or technology developed after the filing date of this application.

Further to this point, although the embodiments described herein often utilize credit report information as an example of sensitive information, the embodiments described herein are not limited to such examples. Instead, the embodiments described herein may be implemented in any suitable environment in which it is desirable to identify and control specific type of information. For example, the aforementioned embodiments may be implemented by a financial institution to identify and contain bank account statements, brokerage account statements, tax documents, etc. To provide another example, the aforementioned embodiments may be implemented by a lender to not only identify, re-route, and quarantine credit report information, but to apply similar techniques to prevent the dissemination of loan application documents that are preferably delivered to a client for signature in accordance with a more secure means (e.g., via a secure login to a web server) than via email.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method for account management using smart contracts stored on a blockchain maintained by a plurality of participants, the method comprising:
   verifying, at a processor, at least one transaction from at least one participant, wherein the at least one transaction has a set of parameters, wherein verifying includes accessing a smart contract stored on the blockchain and checking the set of parameters against a set of conditions stored in the smart contract, and when there is no account stored on the blockchain corresponding to the at least one transaction, creating a new account on the blockchain for the at least one participant using funds included in the transaction; and
   when the set of parameters satisfy the set of conditions, indicating, at the processor, a change in a balance for the at least one participant.

2. The computer-implemented method of claim 1, wherein the at least one transaction is a new account funding transaction.

3. The computer-implemented method of claim 1, where the set of parameters include personally identifiable information for at least one person and an amount of funds.

4. The computer-implemented method of claim 1, further comprising, when the set of parameters satisfy the set of conditions, generating and transmitting, via the processor coupled with the network interface, a confirmation to the at least one participant that the transaction has been approved.

5. The computer-implemented method of claim 1, further comprising, when the set of parameters do not satisfy the set of conditions, generating and transmitting, via the processor coupled with the network interface, a rejection to the at least one participant that the transaction has been rejected.

6. The computer-implemented method of claim 1, wherein indicating a change in a fund balance for the at least one participant, further comprises adding funds included in the transaction to an account controlled by the at least one participant.

7. The computer-implemented method of claim 1, further comprising:
   receiving, at the processor coupled with the network interface, a block of transactions;
   verifying, at the processor, the block of transactions;
   transmitting, at the processor coupled with the network interface, the block of transactions to at least one other participant; and
   adding, at a memory coupled with the processor, the block of transactions to a copy of the blockchain.

8. A computer-implemented method for account funding and distribution using smart contracts stored on a blockchain maintained by a plurality of participants, the method comprising:
   verifying, at a processor, a request for funds from at least one participant, wherein the request for funds has a set of parameters, wherein verifying includes accessing a smart contract stored on the blockchain and checking the set of parameters against a set of conditions stored in the smart contract, and when there is no account stored on the blockchain corresponding to the request for funds, creating a new account on the blockchain for the at least one participant using funds included in the request; and
   when the set of parameters satisfy the set of conditions, satisfying the request for funds by transmitting, via the processor coupled with the network interface, the corresponding amount of funds to the at least one participant;
   and generating, via the processor, a block of transactions representative of requests for funds containing the at least one request for funds, and transmitting, via the processor coupled with the network interface, the block of transactions to at least one participant.

9. The computer-implemented method of claim 8, further comprising:
   receiving, at the processor coupled with the network interface, a block of transactions representative of requests for funds;
   verifying, at the processor, the block of transactions;
   transmitting, at the processor coupled with the network interface, the block of transactions to at least one other participant; and
   adding, at a memory coupled with the processor, the block of transactions to a copy of the blockchain.

10. The computer-implemented method of claim 8, wherein the at least one request for funds is a new account funding transaction.

11. The computer-implemented method of claim 8, where the set of parameters include personally identifiable information for at least one person and an amount of funds.

12. The computer-implemented method of claim 8, further comprising, when the set of parameters satisfy the set of conditions, generating and transmitting, via the processor coupled with the network interface, a confirmation to the at least one participant that the request for funds has been approved.

13. The computer-implemented method of claim 8, further comprising, when the set of parameters do not satisfy the set of conditions, generating and transmitting, via the processor coupled with the network interface, a rejection to the at least one participant that the request for funds has been rejected.

14. The computer-implemented method of claim 8, wherein indicating a change in a fund balance for the at least one participant, further comprises adding funds included in the transaction to an account controlled by the at least one participant.

15. A computer system for account funding and distribution using smart contracts stored on a blockchain maintained by a plurality of participants, the computer system comprising:
  a memory configured to store non-transitory computer executable instructions; and
  a processor configured to interface with the memory, wherein the processor is configured to execute the non-transitory computer executable instructions to cause the processor to:
  validate at least one request for funds from at least one participant, wherein the at least one transaction has a set of parameters, wherein validate includes accessing a smart contract stored on the blockchain and checking the set of parameters against a set of conditions stored in the smart contract, and when there is no account stored on the blockchain corresponding to the at least one transaction, creating a new account on the blockchain for the at least one participant using funds included in the transaction; and
  when the set of parameters satisfy the set of conditions, indicate a change in a fund balance for the at least one participant.

16. The system of claim 15, where the set of parameters include personally identifiable information for at least one person and an amount of funds.

17. The system of claim 15, wherein the processor is further configured to execute the non-transitory computer executable instructions to cause the processor to:
  when the set of parameters satisfy the set of conditions, generate and transmit a confirmation to the at least one participant that the transaction has been approved.

18. The system of claim 15, wherein the processor is configured to execute the non-transitory computer executable instructions to cause the processor to:
  when the set of parameters do not satisfy the set of conditions, generate and transmit a rejection to the at least one participant that the transaction has been rejected.

19. The system of claim 15, wherein indicate a change in a fund balance for the at least one participant, further comprises add funds included in the transaction to an account controlled by the at least one participant.

20. The system of claim 15, wherein the processor is configured to execute the non-transitory computer executable instructions to cause the processor to:
  receive a block of transactions;
  verify the block of transactions;
  transmit the block of transactions to at least one other participant; and
  add the block of transactions to a copy of the blockchain.

* * * * *